United States Patent
Sato et al.

(10) Patent No.: US 7,414,633 B2
(45) Date of Patent: Aug. 19, 2008

(54) COLOR CHARACTERISTICS DESCRIPTION APPARATUS, COLOR MANAGEMENT APPARATUS, IMAGE CONVERSION APPARATUS AND COLOR CORRECTION METHOD

(75) Inventors: Tsuneo Sato, Tokyo (JP); Mariko Takahashi, Tokyo (JP); Narihiro Matoba, Tokyo (JP); Hiroaki Sugiura, Tokyo (JP); Shuichi Kagawa, Tokyo (JP); Masayuki Saito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 146 days.

(21) Appl. No.: 09/944,598

(22) Filed: Sep. 4, 2001

(65) Prior Publication Data

US 2002/0044150 A1 Apr. 18, 2002

Related U.S. Application Data

(62) Division of application No. 09/256,368, filed on Feb. 24, 1999, now Pat. No. 7,034,842.

(30) Foreign Application Priority Data

Oct. 8, 1998 (JP) .................................. 10-286268

(51) Int. Cl.
*G09G 5/02* (2006.01)
(52) U.S. Cl. ........................ 345/601; 345/589; 382/232
(58) Field of Classification Search ................. 345/601, 345/605, 602, 589, 289; 382/162, 166, 232; 358/3.23
See application file for complete search history.

(56) References Cited

U.S. PATENT DOCUMENTS

| 4,941,039 | A | * | 7/1990 | E'Errico | 358/518 |
|---|---|---|---|---|---|
| 4,992,861 | A | * | 2/1991 | D'Errico | 358/500 |
| 5,208,911 | A | * | 5/1993 | Newman et al. | 345/600 |
| 5,300,931 | A | * | 4/1994 | Lindsay et al. | 341/106 |
| 5,381,246 | A | * | 1/1995 | Suzuki et al. | 358/500 |

(Continued)

FOREIGN PATENT DOCUMENTS

GB  2282723 A  *  4/1995

(Continued)

OTHER PUBLICATIONS

Data compression with finite windows E. R. Fiala, D. H. Greene, Apr. 1989 Communications of the ACM, vol. 32 Issue 4 ☐☐Publisher: ACM Press.*

(Continued)

*Primary Examiner*—J. Amini
(74) *Attorney, Agent, or Firm*—Birch, Stewart, Kolasch & Birch, LLP

(57) ABSTRACT

A process is provided for developing and converting a lookup table (hereinafter called a "LUT") composed of only characteristic points of the characteristic of a color device and having a volume smaller than that of a multidimensional LUT into a multidimensional LUT by a table development process. Image data converting means uses the multidimensional LUT to convert input image data into output image data. Thus, an effect can be obtained in that a color management apparatus can be operated with only the LUT composed of only characteristic points of the characteristic of the device and having a small volume.

13 Claims, 19 Drawing Sheets

U.S. PATENT DOCUMENTS

| | | | | | |
|---|---|---|---|---|---|
| 5,463,702 | A | * | 10/1995 | Trueblood | 348/391.1 |
| 5,467,087 | A | * | 11/1995 | Chu | 341/51 |
| 5,489,998 | A | * | 2/1996 | Yamada et al. | 358/523 |
| 5,510,788 | A | * | 4/1996 | Jeong et al. | 341/106 |
| 5,537,551 | A | * | 7/1996 | Denenberg et al. | 709/247 |
| 5,581,376 | A | * | 12/1996 | Harrington | 358/518 |
| 5,583,656 | A | * | 12/1996 | Gandhi et al. | 382/234 |
| 5,604,610 | A | * | 2/1997 | Spaulding et al. | 358/525 |
| 5,612,902 | A | * | 3/1997 | Stokes | 702/85 |
| 5,721,791 | A | * | 2/1998 | Maeda et al. | 382/253 |
| 5,724,442 | A | * | 3/1998 | Ogatsu et al. | 382/167 |
| 5,748,342 | A | * | 5/1998 | Usami | 358/500 |
| 5,781,206 | A | * | 7/1998 | Edge | 347/19 |
| 5,809,213 | A | * | 9/1998 | Bhattacharjya | 358/1.6 |
| 5,822,452 | A | * | 10/1998 | Tarolli et al. | 382/166 |
| 5,877,787 | A | * | 3/1999 | Edge | 347/19 |
| 5,905,502 | A | * | 5/1999 | Deering | 345/420 |
| 5,926,647 | A | * | 7/1999 | Adams et al. | 712/36 |
| 5,930,387 | A | * | 7/1999 | Chan et al. | 382/166 |
| 5,943,058 | A | * | 8/1999 | Nagy | 345/582 |
| 6,011,595 | A | * | 1/2000 | Henderson et al. | 348/590 |
| 6,027,201 | A | * | 2/2000 | Edge | 347/19 |
| 6,036,650 | A | * | 3/2000 | Wu et al. | 600/462 |
| 6,118,116 | A | * | 9/2000 | Sawada et al. | 250/208.1 |
| 6,127,843 | A | * | 10/2000 | Agrawal et al. | 326/40 |
| 6,141,450 | A | * | 10/2000 | Chen et al. | 382/237 |
| 6,215,910 | B1 | * | 4/2001 | Chaddha | 382/253 |
| 6,247,014 | B1 | * | 6/2001 | Ladwig et al. | 707/100 |
| 6,256,104 | B1 | * | 7/2001 | Rumph et al. | 358/1.15 |
| 6,327,421 | B1 | * | 12/2001 | Tiwari et al. | 386/68 |
| 6,330,000 | B1 | * | 12/2001 | Fenney et al. | 345/586 |
| 6,362,808 | B1 | * | 3/2002 | Edge et al. | 345/601 |
| 6,400,843 | B1 | * | 6/2002 | Shu et al. | 382/167 |
| RE38,180 | E | * | 7/2003 | Edge | 347/19 |
| 6,633,330 | B1 | * | 10/2003 | Sugiura et al. | 348/188 |
| 6,798,843 | B1 | * | 9/2004 | Wright et al. | 375/296 |
| 2001/0046319 | A1 | * | 11/2001 | Ohta | 382/167 |
| 2002/0181018 | A1 | * | 12/2002 | Hung | 358/1.15 |
| 2003/0043162 | A1 | * | 3/2003 | Kondo | 345/589 |

FOREIGN PATENT DOCUMENTS

| | | | | | |
|---|---|---|---|---|---|
| JP | 63-209941 | A | | 8/1988 | |
| JP | 02086388 | A | * | 3/1990 | |
| JP | 02136848 | A | * | 5/1990 | |
| JP | 0226870 | A | * | 9/1990 | |
| JP | 292027 | | | 10/1994 | |
| JP | 06292027 | | * | 10/1994 | 1/415 |
| JP | 7-23246 | A | | 1/1995 | |
| JP | 9-51447 | A | | 2/1997 | |
| JP | 10-126636 | A | | 5/1998 | |
| JP | 10-173951 | A | | 6/1998 | |

OTHER PUBLICATIONS

Graphic Formats for Linux Gerald Graef Mar. 1996 Linux Journal Publisher: Specialized Systems Consultants, Inc.*

ICC Profile Format Specification, Version 3.3.—Nov. 11, 1996, International Color Consortium.

* cited by examiner

| INPUT (I0, I1, ···, In) | OUTPUT (O0, O1, ···, Om) |
|---|---|
| (0, 0, ···, 0) | (0, 2, ···, 0) |
| (10, 0, ···, 0) | (40, 2, ···, 0) |
| (0, 0, ···, 50) | (0, 2, ···, 100) |
| ⋮ | ⋮ |
| (20, 40, ···, 0) | (40, 20, ···, 0) |

RELATIONSHIP BETWEEN INPUTS AND OUTPUTS OF GRID POINTS USING STRAIGHT LINE INTERPRETATION

RELATIONSHIP BETWEEN INPUTS AND OUTPUTS OF GRID POINTS USING SPLINE INTERPRETATION

FIG. 21
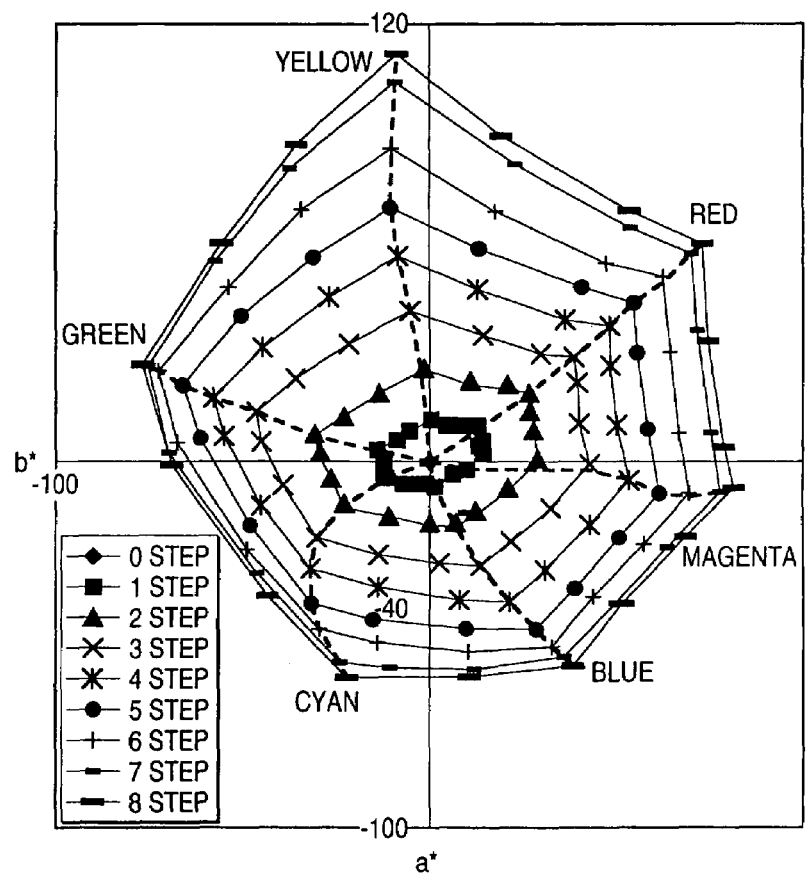
FIG. 22A  PRIMARY COLOR
COLOR COMPOSED OF
ONE PRIMARY COLOR
 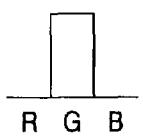 
FIG. 22B  SECONDARY COLOR
COLOR COMPOSED OF
TWO PRIMARY COLORS
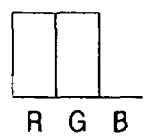 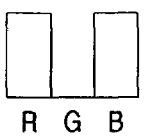 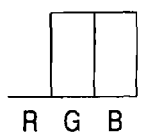
FIG. 22C  TERTIARY COLOR
COLOR COMPOSED OF
THREE PRIMARY COLORS
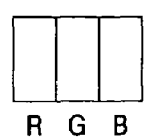

FIG. 29
CONVENTIONAL ART

| BYTE OFFSET | CONTENT |
|---|---|
| 0 - 3 | 'mft1' (6D667431h) [ MULTI-FUNCTION TABLE WITH 1 BYTE PRECISION ] TYPE DESCRIPTOR |
| 4 - 7 | RESERVED, MUST BE SET 0 |
| 8 | NUMBER OF INPUT CHANNELS |
| 9 | NUMBER OF OUTPUT CHANNELS |
| 10 | NUMBER OF CLUT GRID POINTS (IDENTICAL FOR EACH SIDE) |
| 11 | RESERVED FOR PADDING (FILL WITH 00h) |
| 12 - 15 | ENCODED e00 PARAMETER |
| 16 - 19 | ENCODED e01 PARAMETER |
| 20 - 23 | ENCODED e02 PARAMETER |
| 24 - 27 | ENCODED e10 PARAMETER |
| 28 - 31 | ENCODED e11 PARAMETER |
| 32 - 35 | ENCODED e12 PARAMETER |
| 36 - 39 | ENCODED e20 PARAMETER |
| 40 - 43 | ENCODED e21 PARAMETER |
| 44 - 47 | ENCODED e22 PARAMETER |
| 48 - m | INPUT TABLES |
| m+1 - n | CLUT VALUES |
| n+1 - o | OUTPUT TABLES |

COLOR CHARACTERISTICS DESCRIPTION APPARATUS, COLOR MANAGEMENT APPARATUS, IMAGE CONVERSION APPARATUS AND COLOR CORRECTION METHOD

This application is a divisional application Ser. No. 09/256,368, filed on Feb. 24, 1999, now U.S. Pat. No. 7,034,842 the entire contents of which are hereby incorporated by reference and for which priority is claimed under 35 U.S.C. § 120; and this application claims priority of Application No. Hei. 10-286268 filed in Japan on Oct. 8, 1998 under 35 U.S.C. § 119.

BACKGROUND OF THE INVENTION

1. Field of the Invention

The present invention relates to a color characteristic description apparatus for use in a system for handling images, a color management apparatus and an image converting apparatus to which the color characteristic description apparatus is applied and a color correction method.

2. Description of the Related Art

FIG. 29 shows one of tag types which are elements of a profile for describing a color characteristic disclosed in, for example, "ICC Profile Format Specification, Version 3.3, Nov. 11, 1996, International Color Consortium". Referring to FIG. 29, bytes 0 to 3 are identifiers, 4 to 7 are reserved bytes, 8 is the number of input channels, 9 is the number of output channels, 10 is the number of grid points in multidimensional lookup table to be described later, 11 is a reserved byte for padding, 12 to 15, 16 to 19, 20 to 23, 24 to 27, 28 to 31, 32 to 35, 36 to 39, 40 to 43 and 44 to 47 are encoded parameters eij (i, j=0 to 2), 48 to m are input one dimensional tables, m+1 to n are n-dimensional m bytes (n is the number of input channels and m is the number of output channels). The above-mentioned table is also called a multidimensional lookup table. Note that n+1 to o is an output one-dimensional lookup table.

A process for converting a supplied image signal into an output image signal by using data shown in FIG. 29 is shown in FIG. 30. Referring to the drawing, C1 shows a conventional process for converting an image signal. A supplied image signal is first subjected to a process C11 using a matrix. The matrix is described with parameter eij (i, j=0 to 2) of tag types 12 to 15, 16 to 19, 20 to 23, 24 to 27, 28 to 31, 32 to 35, 36 to 39, 40 to 43 and 44 to 47. The calculation is performed in accordance with Equation 1 on an assumption that a supplied image signal is [X, Y, Z]:

$$\begin{bmatrix} X' \\ Y' \\ Z' \end{bmatrix} = \begin{bmatrix} e00 & e01 & e02 \\ e10 & e11 & e12 \\ e20 & e21 & e22 \end{bmatrix} \begin{bmatrix} X \\ Y \\ Z \end{bmatrix} \quad (1)$$

In the foregoing formula, [X', Y', Z'] is a value of the signal converted into the matrix. Note that the process using the matrix is performed only when the color space of the supplied image signal is XYZ color space.

Then, a process C12 using an input one-dimensional lookup table is performed. The input one-dimensional lookup table is composed of data written in 48 byte to m byte of a tag type. One-byte data corresponding to input signal 0 to 255, that is, 256-byte data is used as data for one channel. The input one-dimensional lookup table is composed of input channel data (256×input channels). Assuming that an input signal is [A0, B0, C0], a calculation is performed in accordance with Equation 2.

$$A1 = f_1(A0) \quad (2)$$
$$B1 = g_1(B0)$$
$$C1 = h_1(C0)$$

In the foregoing equation, [A1, B1, C1] is a value of the signal subjected to the process using the input one-dimensional lookup table. Moreover, f1, g1 and h1 are functions indicated by the input one-dimensional lookup table for each channel.

Then, a process C13 using a multidimensional lookup table is performed. The multidimensional lookup table is composed of data written in m+1 to n bytes of the tag type. In an example case of a three-dimensional input and three-dimensional output multidimensional lookup table, a value [A2, B2, C2] (three bytes) of a signal obtained by subjecting an input signal [A1, B1, C1] (three byte) to the process using the multidimensional lookup table is composed of data for the number of input signals corresponding to grid points of the multidimensional lookup table. The byte size of the multidimensional lookup table is expressed by the following Equation 3.

$$\text{TableSize} = \text{GridPoints}^{Inputchannels} \cdot \text{OutputChannels} \quad (3)$$

In the foregoing equation, "Tablesize" is the size of the multidimensional lookup table, "GridPoints" is the number of grid points of the multidimensional lookup table, "InputChannels" is the number of input channels and "OutputChannels" is the number of output channels.

The process using the multidimensional lookup table is performed as follows. Assuming that the input signal is [A1, B1, C1], a value of the processed signal is [A2, b2, C2] and the process using the multidimensional lookup table is expressed by F, a calculation is performed in accordance with Equation 4. The foregoing process is characterized in that combined data [A1, B1, C1] of the input signals for three channels is performed.

$$[A2, B2, C2] = F([A1\ B1\ C1]) \quad (4)$$

Then, a process C14 using an out put one-dimensional lookup table is performed. The input one-dimensional lookup table is composed of data written on n+1 byte to o byte of the tag type. Similarly to the input one-dimensional lookup table, the output one-dimensional lookup table is composed of one-byte data corresponding to 0 to 255 of the input signal, that is, the input one-dimensional lookup table is composed of data of input channels (256×input channels) on an assumption that 256-byte data is data for one channel. Assuming that an input signal is [A2, B2, C2], a calculation is performed in accordance with Equation 5.

$$A3 = f_2(A2) \quad (5)$$
$$B3 = g_2(B2)$$
$$C3 = h_2(C2)$$

In the foregoing equation, [A3, B3, C3] is a value of the signal subjected to the process using the output one-dimensional lookup table and f2, g2 and h2 are functions indicated by the output one-dimensional lookup table for each channel.

The conventional tag type which is an element of a profile for describing the color characteristic disclosed in "ICC Profile Format Specification, Version 3.3, Nov. 11, 1996, international Color Consortium" has been described as described above. Moreover, the signals have been processed as described above in accordance with described data. Therefore, the profile of a color device having a complicated color characteristic has a problem in that the size of the multidimensional lookup table is enlarged excessively. For example, the size of a three-dimensional input and four-dimensional output multidimensional lookup table having 65 grid points is 1,098,500 bytes, which is about one megabyte which is calculated in accordance with above-mentioned Equation (3). What is worse, the multidimensional lookup table of the above-mentioned type cannot satisfactorily describe the color characteristic of the actual color device. If the table having the above-mentioned size is added to image data which is handled by the color device, the quantity of data corresponding to the above-mentioned volume is enlarged. In the foregoing case, communication cost is enlarged excessively when image data is communicated through a communication line or the like.

SUMMARY OF THE INVENTION

To overcome the above-mentioned problem, an object of the present invention is to provide a method of obtaining precise color characteristic data without enlargement of the quantity of color characteristic data, a color characteristic description method and an apparatus to which the methods are applied.

A color characteristic description apparatus according to a first aspect of the present invention for producing color characteristic data for use when supplied image data is converted into output image data, comprises: a lookup table of color characteristic data, wherein the lookup table is composed of only characteristic points which indicate the relationship between supplied image signals and output image signals which are determined to be impossible to be developed in a table development process which is performed when the lookup table is developed into a multidimensional lookup table.

A color characteristic description apparatus according to the second aspect of the present invention has a structure that the lookup table composed of the characteristic points is described such that fundamental colors composed of primary colors of a color device having the same signal values serve as the characteristic points.

A color characteristic description apparatus according to a third aspect of the present invention has a structure that color characteristic data which is produced by the color characteristic description apparatus contains, in addition to the lookup table, an identifier for identifying a table development method which is employed when the lookup table is developed into the multidimensional lookup table.

A color characteristic description apparatus according to a fourth aspect of the present invention has a structure that color characteristic data which is produced by the color characteristic description apparatus contains, in addition to the lookup table, software for performing a table development process.

A color characteristic description apparatus according to a fifth aspect of the present invention has a structure that color characteristic data which is produced by the color characteristic description apparatus further contains identifiers for identifying a table development method and software for converting data developed into the table into an ICC profile.

A color characteristic description apparatus according to a sixth aspect of the present invention for producing color characteristic data for use when supplied image data is converted into output image data, comprises: a multidimensional lookup table which is produced by the color characteristic description apparatus, wherein color characteristic data which is produced by the color characteristic description apparatus incorporates data obtained by compressing the multidimensional lookup table and an identifier for identifying a restoring method for restoring the compressed multidimensional lookup table.

A color characteristic description apparatus according to a seventh aspect of the present invention for producing color characteristic data for use when supplied image data is converted into output image data, comprises: a multidimensional lookup table which is produced by the color characteristic description apparatus, wherein color characteristic data which is produced by the color characteristic description apparatus incorporates data obtained by compressing the multidimensional lookup table and software for restoring compressed data.

A color management apparatus according to an eighth aspect of the present invention has a structure that color characteristic data which is produced by the color characteristic description apparatus further incorporates an identifier for identifying a restoring method for restoring compressed data and software for converting the restored multidimensional lookup table into an ICC profile.

A color management apparatus according to a ninth aspect of the present invention for converting supplied image data by using a lookup table of color characteristic data into output image data, the color management apparatus comprises: a lookup table which is composed of characteristic points which are points indicating the relationship between supplied image data and output image data which are determined to be impossible to be interpolated when a process for converting image data is performed; and image data converting means for converting supplied image data by using the lookup table composed of the characteristic points into output image data.

A color management apparatus according to a tenth aspect of the present invention further comprises table development means for developing the lookup table into the multidimensional lookup table, wherein the image data converting means uses the multidimensional lookup table developed by the table development means to convert supplied image data into output image data.

A color management apparatus according to an eleventh aspect of the present invention has a structure that the table development means develops the lookup table into the multidimensional lookup table in such a manner that all of characteristic points of the lookup table composed of the characteristic points are contained.

A color management apparatus according to a twelfth aspect of the present invention has a structure that the table development means develops the lookup table into the multidimensional lookup table such that data corresponding to grid points of the multidimensional lookup table is composed of output data of the lookup table and data of information of adjacent grid points for interpolating a portion between grid points.

A color management apparatus according to a thirteenth aspect of the present invention has a structure that the multidimensional lookup table is a compressed multidimensional lookup table formed by compressing the multidimensional lookup table, restoring means is provided which restores the compressed multidimensional lookup table into the multidimensional lookup table, and the image data converting means causes the restoring means to restore the compressed multidimensional lookup table and uses obtained multidimensional lookup table to convert supplied image data into output image data.

A color management apparatus according to a fourteenth aspect of the present invention further comprises: table recording means for recording the multidimensional lookup table developed by the table development means in a memory; and updating means for operating the table development means and the table recording means when the lookup table composed of the characteristic points has been updated to update the multidimensional lookup table and rewrite the updated multidimensional lookup table on the memory, wherein the image data converting means uses the multidimensional lookup table recorded in the memory to convert supplied image data into output image data.

A color management apparatus according to a fifteenth aspect of the present invention comprises: image data converging means which uses a lookup table of color characteristic data produced by a characteristic description apparatus to convert supplied image data into output image data and which has a structure that the lookup table is composed of characteristic points which are points indicating the relationship between supplied image data and output image data which are determined to be impossible to be interpolated when the image data converting means performed an image data converting process; and a storage portion for storing a plurality of color characteristic data items having different color characteristics, wherein color characteristic data is selected in accordance with the characteristic of image data and selected color characteristic data is used by the color management apparatus to convert supplied image data into output image data.

A color correction method according to a sixteenth aspect of the present invention and structured such that a multidimensional lookup table is used to convert a supplied image signal into an output image signal, the color correction method comprising the steps of: producing a lookup table composed of characteristic points which are points indicating the relationship between input color image signals and output color image signals which are determined to be impossible to be developed in a table development process; performing table development process such that the lookup table composed of the characteristic points is developed into a multidimensional lookup table; and converting supplied image signal into an output image signal by using the multidimensional lookup table obtained by developing the lookup table composed of the characteristic points.

BRIEF DESCRIPTION OF THE DRAWINGS

FIG. 21 is a graph showing the color characteristic of a color device according to a tenth embodiment of the present invention.

FIGS. 22A to 22C are diagrams showing fundamental colors according to the tenth embodiment of the present invention.

FIG. 29 is a diagram showing a tag type of a conventional apparatus.

DETAILED DESCRIPTION OF THE PREFERRED EMBODIMENTS

Now, a description will be given in more detail of preferred embodiments of invention with reference to the accompanying drawings.

First Embodiment

Figure 1:
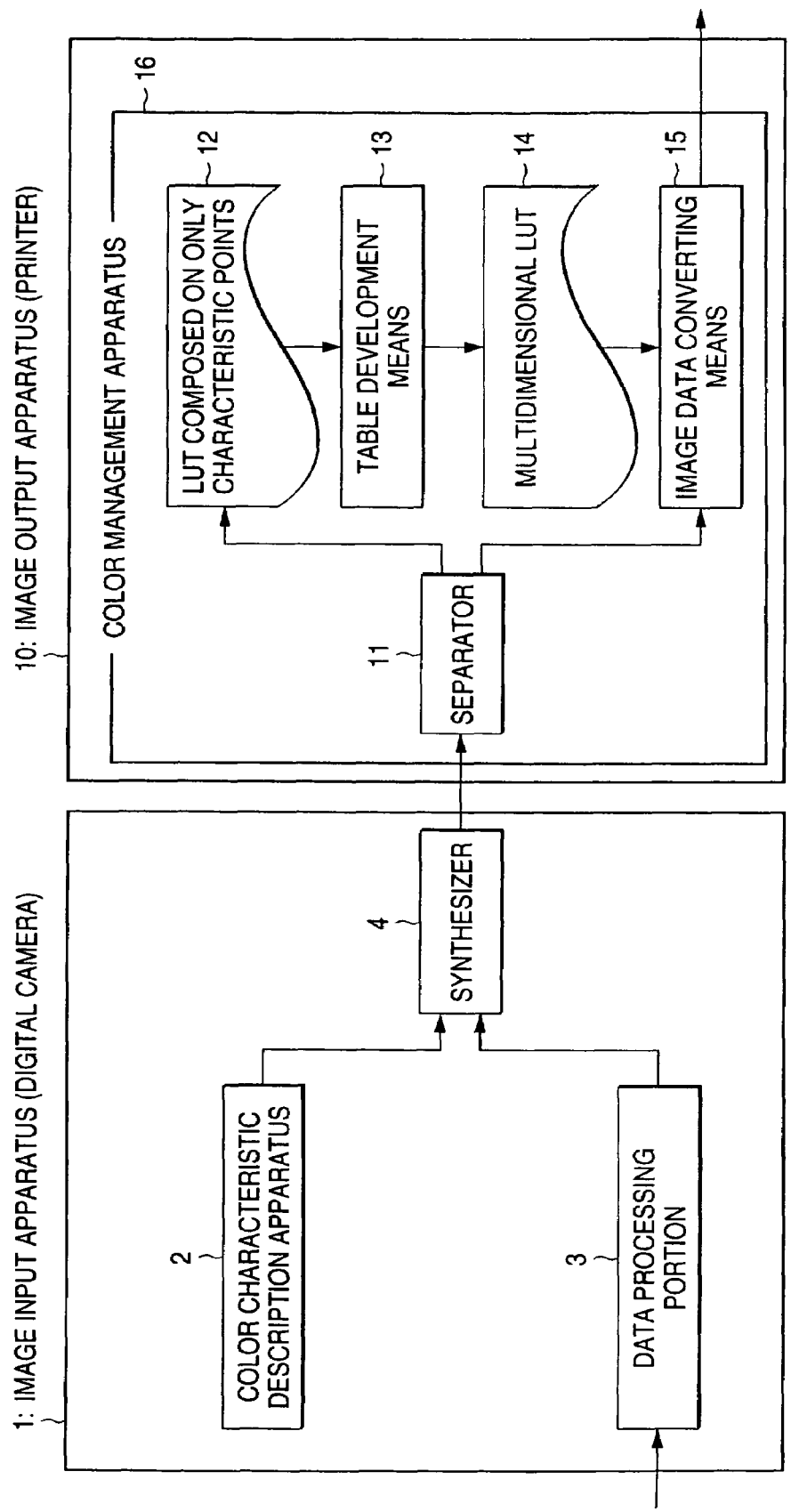
FIG. 1 is a block diagram showing the overall structure according to a first embodiment of the present invention.
Figure 6:
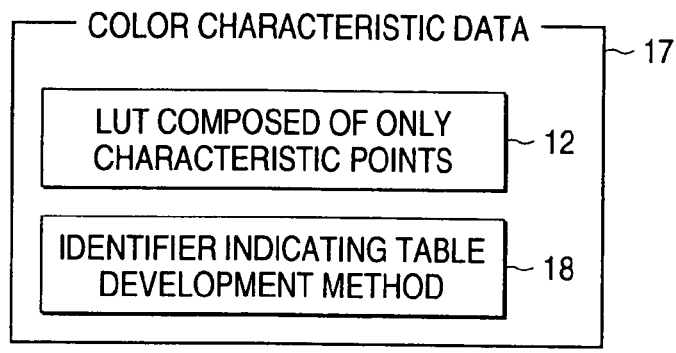
FIG. 6 is a diagram showing the structure of color characteristic data according to the first embodiment of the present invention.

A first embodiment of the present invention will now be described. FIG. 1 is a block diagram showing the overall structure of a first embodiment of the present invention. Reference numeral 1 represents a digital camera which is an image input apparatus (a color device). Reference numeral 2 represents a color characteristic description apparatus for producing color characteristic data structured as shown in FIG. 6 and incorporating a lookup table (hereinafter called a "LUT") composed of characteristic points adapted to the color characteristic of the digital camera which has been measured by a colorimeter and an identifier indicating a table development method. Reference numeral 3 represents a data processing means for converting an image photographed by the digital camera into digital image data signal. Reference numeral 4 represents a synthesizer for synthesizing color characteristic data and the image data signal into an image data format. The color characteristic of the digital camera may be examined in a real time manner when the data processing means 3 converts the photographed image into the digital image data signal.

Reference numeral 10 represents a color printer for printing the image photographed by the digital camera 1. Reference numeral 11 represents a separator for separating the image data format transmitted from the digital camera 1 into an image data signal and color characteristic data. Reference numeral 12 represents a LUT of color characteristic data. Reference numeral 13 represents a table development means. Reference numeral 14 represents a multidimensional LUT developed by the table development means. Reference numeral 15 represents an image-data converting means using the multidimensional LUT 14 to convert input image data separated by the separator 11 into output image data. The separator 11, the table development means 13, the multidimensional LUT 14 and the image-data converting means 15 constitute a color management apparatus 16.

A signal transmitted from the color management apparatus 16 is processed in the color printer 10 similarly to the conventional structure so that the signal is printed.

Figures 2, 3:
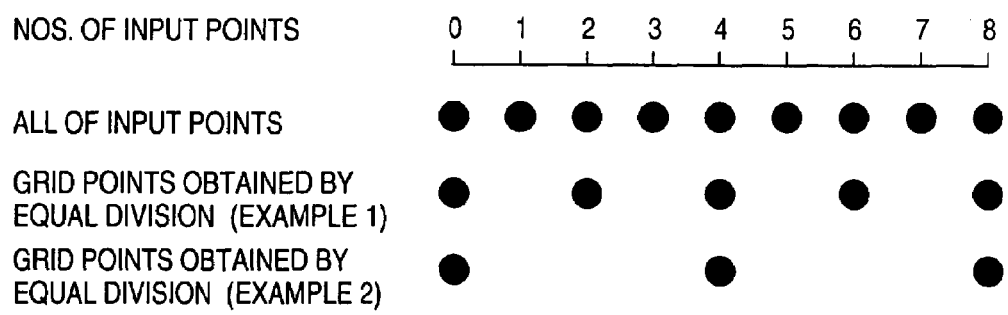
FIG. 2 is a diagram showing a lookup table according to the first embodiment of the present invention.
FIG. 3 is a diagram showing grid points of the lookup table according to the first embodiment of the present invention.

The operation will now be described. The LUT is a table showing the relationship between certain input signals (I0, I1, ..., In) and output signals (O0, O1, ..., Om) which must be transmitted, as shown in FIG. 2, where n and m are each an integer. As a matter of course, the foregoing LUT is a LUT only for describing the color characteristic of the color device.

FIG. 2 shows a table for converting n-dimensional input into m-dimensional output. Although the relationship between all of the inputs and outputs may be described in the foregoing LUT, enlargement of the number of combinations of the inputs and outputs must be prevented. In general, a LUT composed of a combination of inputs and outputs at grid points constituted by equally dividing the input side axis is employed in general.

A LUT of the foregoing type composed of the pairs of an input and an output at each of the grid points formed by equally dividing the input side axis is generally called a multidimensional LUT 14.

FIG. 3 shows an example of the multidimensional LUT 14 in a case of one dimension. If nine input points exists, grid points having intervals of 2 are shown in example 1. Grid points having intervals of 4 are shown in example 2. The other dimensions are similar to the example of the one dimension.

The number of pairs of inputs and outputs can be reduced as compared with the number of pairs of all of inputs and outputs. However, the multidimensional LUT 14 must incorporate a LUT composed of a large number of pairs of inputs and outputs to improve the accuracy when the color characteristic of a color device is described. Therefore, the present invention incorporates the LUT 12 composed of the characteristic points. The LUT 12 composed of the characteristic points will now be described with reference to FIGS. 4A tp 4F.

Figure 4A:
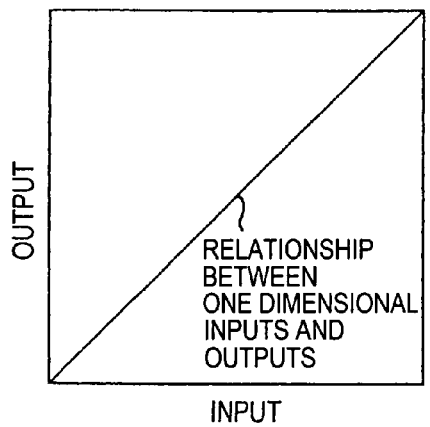
FIGS. 4A to 4F are diagrams showing a lookup table composed of only characteristic points according to the first embodiment of the present invention.
Figure 4B:
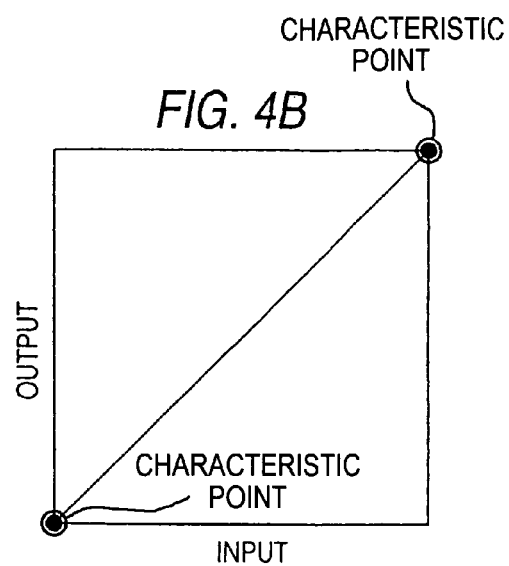
Figure 4C:
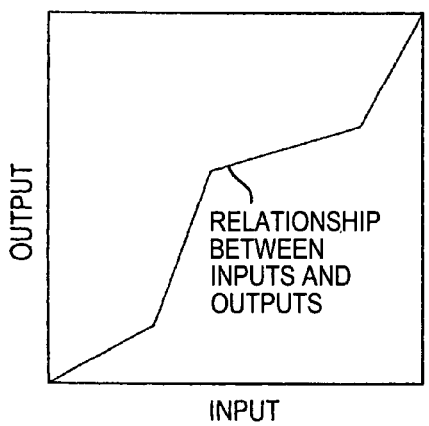
Figure 4D:
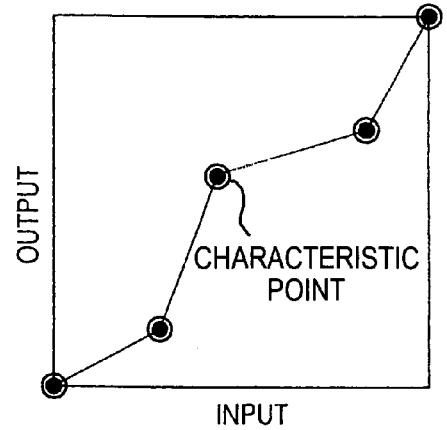
Figure 4E:
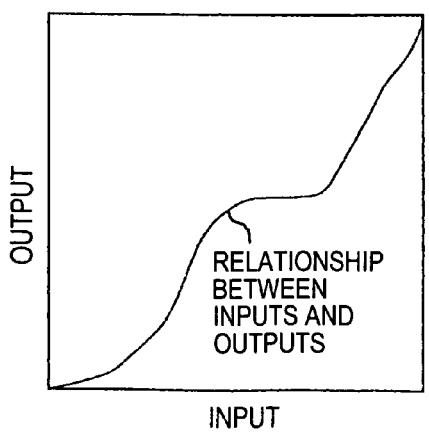
Figure 4F:
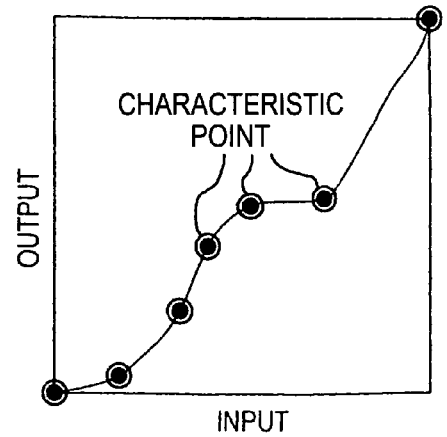

FIGS. 4A to 4F are graphs showing the relationship between one-dimensional inputs and outputs. In a case of the relationship between inputs and outputs shown in FIG. 4A, the relationship between inputs and outputs shown in FIG. 4A can be obtained if the relationship between inputs and outputs of a first point and a final point because a straight line can be determined when two points are given. A point indicating the relationship between the first point and the final point is called a characteristic point in the present invention. The characteristic points of the relationship between the input and output shown in FIG. 4A are expressed with a double line circles in FIG. 4B. In a case of the relationship between the inputs and outputs in the form of a broken line shown in FIG. 4C, the characteristic points are points indicating the relationship between the first point and the final point and that between the input and output at each broken point as shown in FIG. 4D. In a further complicated relationship between inputs and outputs as shown in FIG. 4E, the characteristic points are the first and final points and points at each of which the curvature of the relationship between the inputs and outputs is considerably changed. FIG. 4F shows characteristic points in FIG. 4E. The characteristic point are changed depending on the process which is performed by the table development means 13 which will be described below. In the present invention, points indicating the relationship between inputs and outputs which are determined to be impossible to be developed in a table development process are defined to be the characteristic points.

The data processing means 3 converts the image photographed by the digital camera 1 into a digital signal. The digital image signal and color characteristic data having the lookup table composed of only the characteristic points adapted to the color characteristic of the digital camera and an identifier indicating a table development method are synthesized by the synthesizer 4 into an image data format which is then transmitted to the color printer 10. The structure of color characteristic data is shown in FIG. 6. Referring to FIG. 6, reference numeral 17 represents color characteristic data, 12 represents the LUT composed of only the characteristic points and 18 represents the identifier indicating a table development method.

Figure 7:
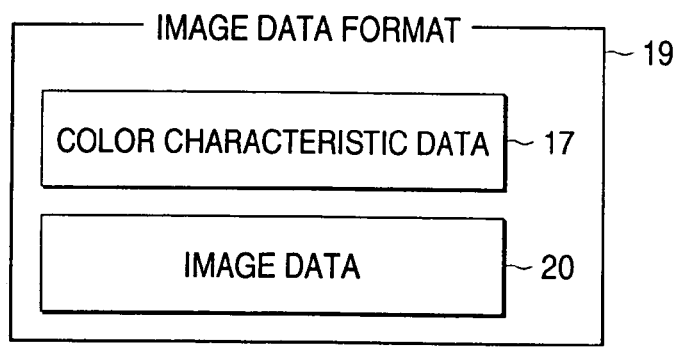
FIG. 7 is a diagram showing the structure of an image data format according to the first embodiment of the present invention.

The structure of the image data format synthesized by the synthesizer 4 is shown in FIG. 7. Reference numeral 19 represents an image data format, 17 represents color characteristic data and 20 represents image data.

In the color printer 10, the separator 11 performs separation into color characteristic data 17 and image data 20. Color characteristic data 17 is supplied to the table development means 13, while image data 20 is supplied to the image-data converting means 15.

The operation of the table development means 13 will now be described. The table development means 13 develops the LUT 12 composed of only the characteristic points into the multidimensional LUT 14 by selecting a table development method suitable to the color characteristic of the digital camera 1 by the identifier 18 of color characteristic data 17. As described above, the multidimensional LUT 14 is a LUT composed of pairs of inputs and outputs at the grid points formed by equally dividing the input side axis. On the other hand, the LUT 12 composed of only the characteristic points is a LUT composed of the pairs of the relationship of the inputs and outputs which are determined to be impossible to be developed in the development process which is performed by the table development means 13. Therefore, the characteristic points are not always positioned on the grid points formed by equally dividing the input side axis. Therefore, the grid points formed by equally dividing the input side axis are made to be the inputs. Moreover, the LUT 12 composed of only the characteristic points is used to perform an operation for obtaining outputs so as to obtain the multidimensional LUT 14.

Figure 5A:
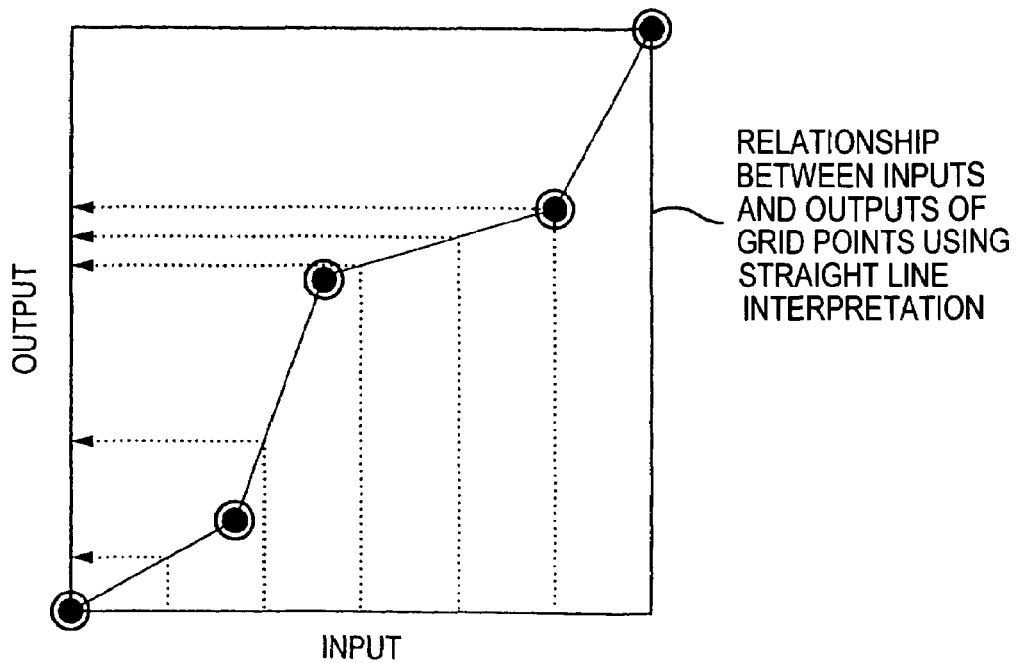
FIGS. 5A and 5B are diagrams showing a table development process according to the first embodiment of the present invention.
Figure 5B:
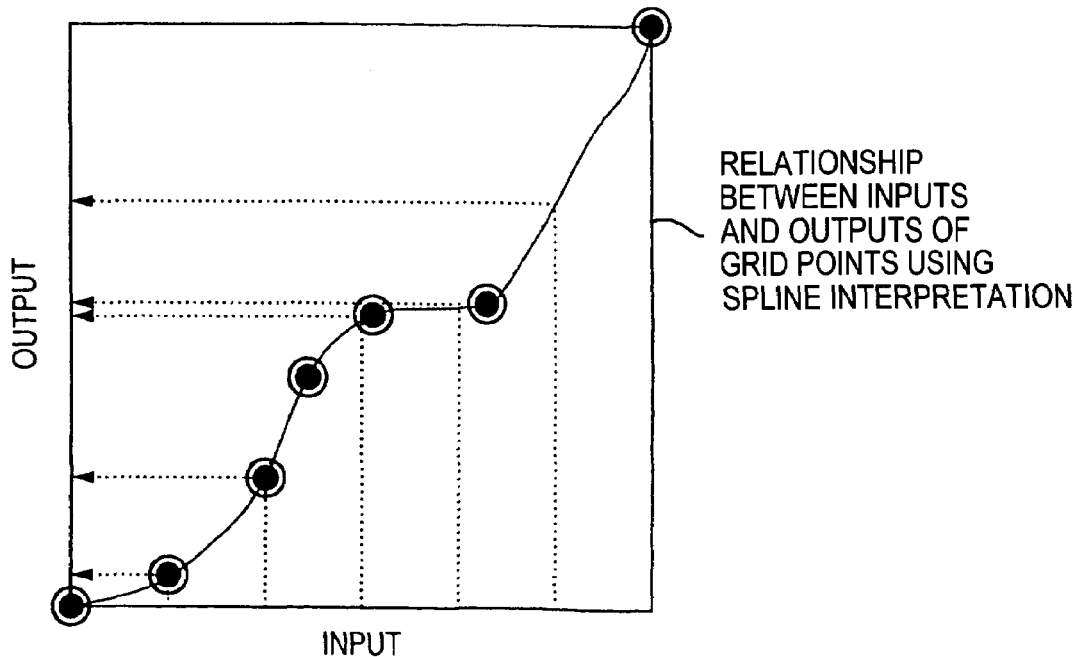

The process shown in FIGS. 5A and 5B will now be described such that the LUT 12 composed of the characteristic point of one-dimensional inputs and one-dimensional outputs is taken as an example. FIGS. 5A and 5B show a structure in which the relationship between inputs and outputs of grid points formed by dividing the input side axis into six portions is obtained. To obtain the relationship between the inputs and outputs of the grid points except for the characteristic points, interpolation is performed by using the adjacent characteristic points. The interpolation may be a known straight interpolation or spline interpolation. FIG. 5A shows a table development process employing the straight interpolation. Start points of arrows in the form of dashed lines indicating the correspondence between inputs and outputs of each grid point of the multidimensional LUT 14 are input values. Final points of the arrows are output values corresponding to the input values. FIG. 5B shows a table development process employing the spline interpolation. Start points of arrows in the form of dashed lines indicating the correspondence between inputs and outputs at the grid points of the multidimensional LUT 14 are input value. Final points of the arrows are output values corresponding to the input values. Thus, the multidimensional LUT 14 is produced by the process performed by the table development means 13. FIGS. 5A and SB show the LUT 12 composed of the characteristic points of one-dimensional inputs and one-dimensional outputs. However, also a LUT 12 composed of characteristic points of n-dimensional inputs and m-dimensional outputs enables the multidimensional LUT 14 to be obtained after a similar process has been performed. In this case, a complicated interpolation process must be performed as compared with the straight interpolation and the spline interpolation which are simple interpolations.

Then, the image-data converting means 15 will now be described which performs the interpolation similarly to the table development means 13 except for the multidimensional LUT 14 which is used by the image-data converting means 15. Since the multidimensional LUT 14 is composed of the grid points obtained by equally dividing the input side axis, retrieval of the table can easily be performed as compared with a process using the LUT 12. Moreover, the calculations for the interpolation can independently be performed for each axis. Therefore, data in a large quantity, such as image data 20, can quickly be converted.

Input image data of the image-data converting means 15 varies depending upon the type of the image input apparatus. Input image data is digital image signals, such as R, G and B signals of a scanner, R, G and B signals of a monitor, R, G and B signals of a CIE, X, Y and Z signals of the CIE or L, a and b signals of the CIE. On the other hand, output data of the image-data converting means 15 depends on the contents of the table development means 13, that is, the type of the image input apparatus. Output data above is R, G and B signals of a scanner, R, G and B signals of a monitor, C, M and Y signals of a printer, R, G and B signals of a CIE, X, Y and Z signals of the CIE or L, a and b signals of the CIE.

As described above, the first embodiment has the process for converting the LUT 12 having a smaller quantity as compared with the multidimensional LUT 14 and composed of only the characteristic points of the characteristic of the digital camera 1 into the multidimensional LUT 14 by the table development means 13. Therefore, the characteristic of the image input apparatus can be described by only the LUT 12 having a small quantity and composed only the characteristic points.

Second Embodiment

Figure 8:
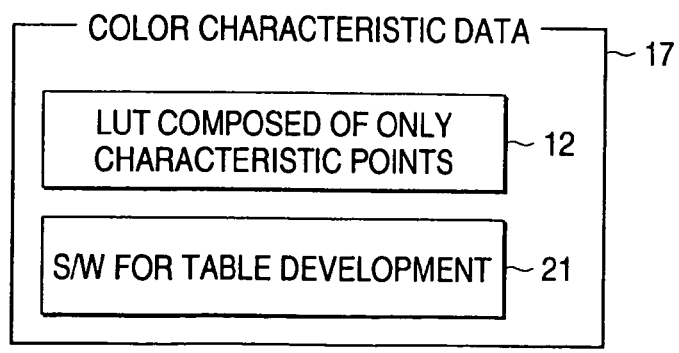
FIG. 8 is a diagram showing the structure of color characteristic data according to a second embodiment of the present invention.

A second embodiment of the present invention will now be described. FIG. 8 is a diagram showing the structure of color characteristic data 17 according to the second embodiment of the present invention. Color characteristic data 17 is another example of color characteristic data 17 which is produced by the color characteristic description apparatus 2 shown in FIG. 1. Reference numeral 17 represents color characteristic data according to the present invention. Reference numeral 12 represents a LUT which is an element of color characteristic data 17 and composed of characteristic points. Reference numeral 21 represents software which is an element of color characteristic data 17 and which performs a table development process.

The operation of a color management apparatus using color characteristic data 17 according to the second embodiment will now be described such that the first embodiment is taken as an example. The LUT 12 composed of only the characteristic points in color characteristic data 17 is employed as the LUT 12 composed of only characteristic points in the color management apparatus 16 according to the first embodiment. Software 21 in the color characteristic data 17 for performing a table development process is loaded as software of the table development means 13 and executed so that the table development is performed. Thus, development to the multidimensional LUT 14 is performed. Then, the image-data converting means 15 uses the multidimensional LUT 14 to convert input image data into output image data.

As described above, the second embodiment has the structure that color characteristic data 17 is composed of the LUT 12 composed of only characteristic points and the software 21 for performing the table development process. Therefore, the color management apparatus 16 incorporating the LUT 12 composed of only the characteristic points according to the first embodiment can be operated such that the table development means 13 changes the development method to correspond to color characteristic data 17.

Third Embodiment

Figure 9:
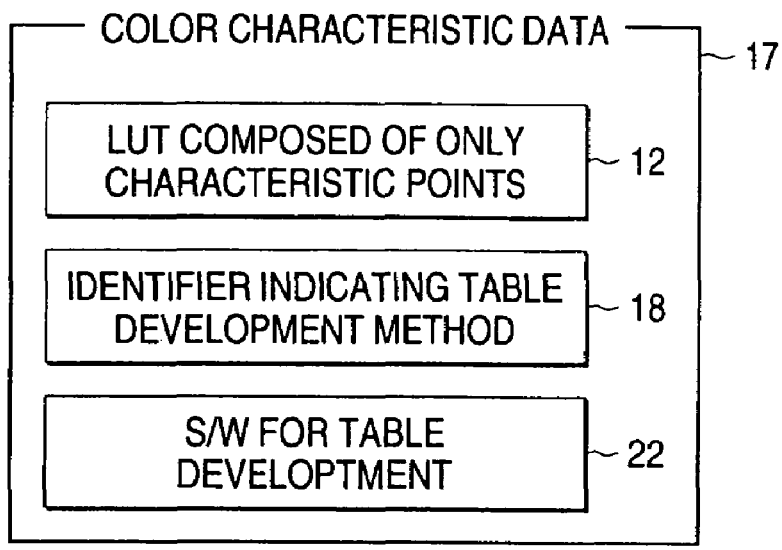
FIG. 9 is a diagram showing the structure of color characteristic data according to a third embodiment of the present invention.

A third embodiment of the present invention will now be described with reference to the drawings. FIG. 9 is a diagram showing color characteristic data according to the third embodiment of the present invention. Color characteristic data according to this embodiment is another example of color characteristic data 17 which is produced by the color characteristic description apparatus 2 shown in FIG. 1. Reference numeral 17 represents color characteristic data according to the present invention. Reference numeral 12 represents a LUT which is an element of color characteristic data 17 and which is composed of only characteristic points. Reference numeral 18 represents an identifier which is an element of color characteristic data 17 and which indicates a table development method. Reference numeral 22 represents software which is an element of color characteristic data 17 and which performs the table development process.

The operation of a color management apparatus using color characteristic data 17 according to the third embodiment will now be described. The LUT 12 which is included in color characteristic data 17 and which is composed of only characteristic points is used as the LUT 12 in the color management apparatus 16 according to the first embodiment, the LUT 12 being composed of only characteristic points. The identifier 18 indicating the table development method is used by a CPU (not shown) or the like which selects the development method to which the table development means 12 corresponds. If any corresponding table development method does not exist, software 22 in color characteristic data 17 for performing the table development process is loaded as software for the table development means 13. Then, the table development means 13 performs table development so that development into the multidimensional LUT 14 is performed. Then, the image-data converting means 15 uses the multidimensional LUT 14 to convert input image data into output image data.

As described above, the third embodiment has the structure that color characteristic data 17 is composed of the LUT 12 which is composed of only characteristic points, the identifier 18 indicating the table development method and the software 22 for performing the table development. Therefore, the digital camera 1 according to the first embodiment and arranged to use the LUT 12 which is composed of only characteristic points is able to perform table development if an appropriate table development method exists. Even if any appropriate table development method does not exist, the software 22 for performing the table development is loaded to perform the table development. Thus, the digital camera 1 can be operated as described above.

Fourth Embodiment

Figure 10:
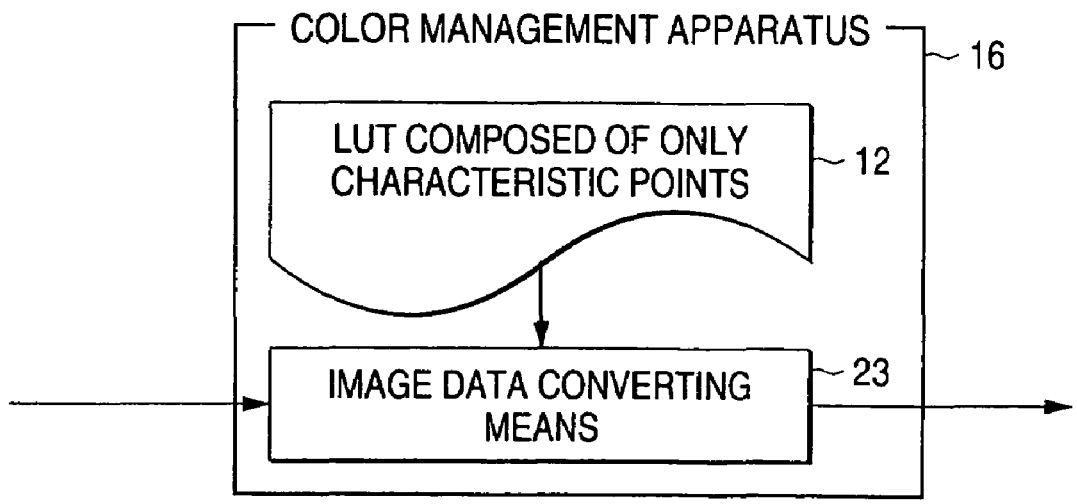
FIG. 10 is a block diagram showing a color management apparatus according to a fourth embodiment of the present invention.

A fourth embodiment of the present invention will now be described. FIG. 10 is a block diagram showing a color management apparatus 16 according to a fourth embodiment of the present invention. Reference numeral 16 represents a color management apparatus according to the present invention. Reference numeral 12 represents a LUT composed of only characteristic points. Reference numeral 23 represents an image-data converting means for converting input image data into output image data by using the LUT 12 composed of only characteristic points. Input image data of the image-data converting means varies depending on the type of the image input apparatus. Input image data is digital image signals, such as R, G and B signals of a scanner, R, G and B signals of a monitor, R, G and B signals of a CIE, X, Y and Z signals of the CIE or L, a and b signals of the CIE. Output data depends on the contents (the type of the image input apparatus) of the LUT 12 composed of only characteristic points. Output data is R, G and B signals of a scanner, R, G and B signals of a monitor, C, M and Y signals of a printer, R, G and B signals of a CIE, X, Y and Z signals of the CIE or L, a and b signals of the CIE.

The LUT 12 composed of only characteristic points is similar to the LUT 12 which is produced by the color characteristic description apparatus 2 of the image input apparatus 1 according to the first embodiment. Therefore, the LUT 12 is omitted from description.

Figure 11:
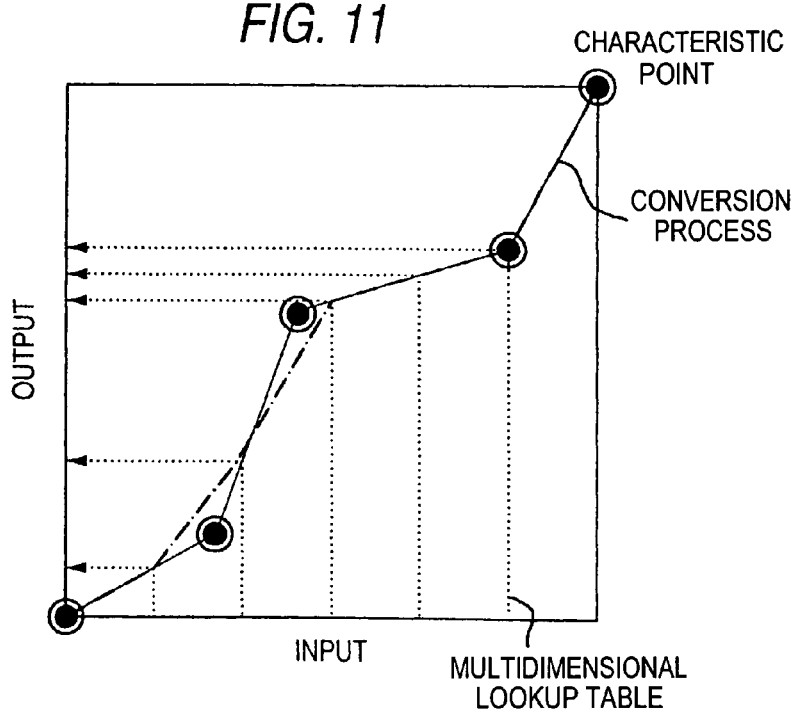
FIG. 11 is a diagram showing image data conversion process according to the fourth embodiment of the present invention.

The image-data converting means 23 will now be described. Similarly to the image-data converting means 15 according to the first embodiment, input image data is converted into output image data. The difference lies in that the LUT 12 composed of only characteristic points is used to perform the conversion process. Referring to FIG. 11, the difference will now be described. An alternate long and short dash line shown in FIG. 11 indicates a process for performing the conversion process by using the multidimensional LUT 14. Arrows in the form of dashed lines indicate the multidimensional LUT 14 according to the first embodiment. A solid line shown in FIG. 11 indicates a conversion process using the LUT 12 composed of only characteristic points. When the conversion process is performed by using the multidimensional LUT 14, loss of information of inputs and outputs indicated by the characteristic points is sometimes caused depending on a method of selecting the grid points in the multidimensional LUT 14. If the conversion process is performed by using the LUT 12 composed of only characteristic points, the loss of information of inputs and outputs indicated by the characteristic points can be prevented.

As described above, the fourth embodiment is provided with the image-data converting means 23 which uses the LUT 12, the quantity of which is smaller than that of the multidimensional LUT 14. The LUT 12 is composed of only characteristic points of the color characteristic of a color device (an image input apparatus). Therefore, the characteristic of the device can be described by only the LUT 12, the capacity of which is small and which is composed of only characteristic points. Moreover, loss of information indicated by the characteristic points of the characteristic of the color device can be prevented when the process is performed.

Fifth Embodiment

Figure 12:
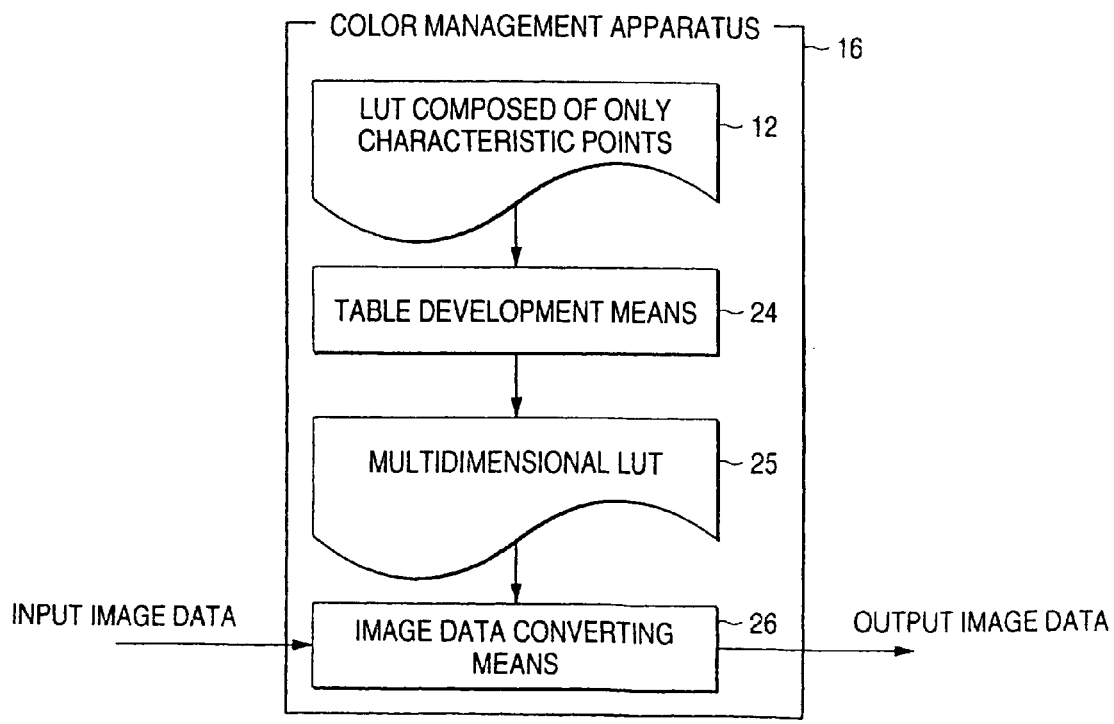
FIG. 12 is a block diagram showing a color management apparatus according to a fifth embodiment of the present invention.

A fifth embodiment of the present invention will now be described with reference to the drawings. FIG. 12 is a block diagram showing a color management apparatus according to the fifth embodiment of the present invention. Reference numeral 16 represents a color management apparatus according to the present invention. Reference numeral 12 represents a LUT composed of only characteristic points. Reference numeral 24 represents a table development means for developing the LUT 12 composed of only characteristic points into a multidimensional lookup table. The table development means 24 performs an operation which is different from that of the table development means 13 according to the first embodiment. Reference numeral 25 represents a multidimensional LUT 25 which is operated differently from the multidimensional LUT 14 according to the first embodiment. Reference numeral 26 represents an image-data converting means which employs the multidimensional LUT 25 to convert input image data into output image data.

Input image data of the image-data converting means 26 varies depending upon the type of the image input apparatus. Input image data is digital image signals, such as R, G and B signals of a scanner, R, G and B signals of a monitor, R, G and B signals of a CIE, X, Y and Z signals of the CIE or L, a and b signals of the CIE. On the other hand, output data depends on the contents of the multidimensional LUT 25 (the type of the image input apparatus), that is, the type of the image input apparatus. Output data above is R, G and B signals of a scanner, R, G and B signals of a monitor, C, M and Y signals of a printer, R, G and B signals of a CIE, X, Y and Z signals of the CIE or L, a and b signals of the CIE.

The LUT 12 composed of only characteristic points is similar to the LUT 12 produced by the color characteristic description apparatus 2 of the digital camera 1 according to the first embodiment and composed of only characteristic points. Therefore, the LUT 12 is omitted from description.

The table development means 24 will now be described. Similarly to the table development means 13 according to the first embodiment, the table development means 24 develops the LUT 12 composed of only characteristic points into a multidimensional lookup table. The difference lies in that development into the usual multidimensional LUT 14 according to the first embodiment is not performed. In this embodiment, development into a new multidimensional LUT 25 according to the present invention is performed.

Figure 13:
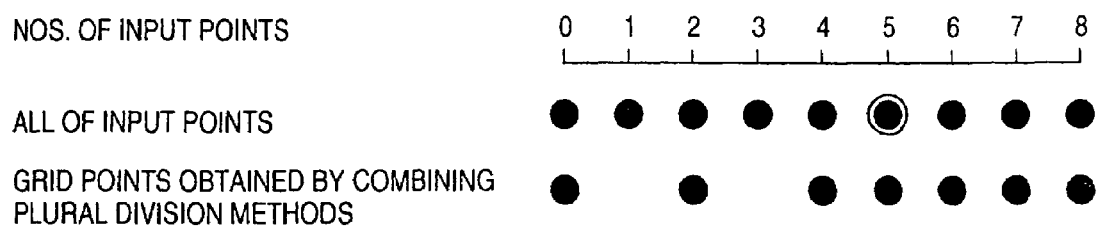
FIG. 13 is a diagram showing grid points of a lookup table according to a fifth embodiment of the present invention.

Initially, the new multidimensional LUT 25 will now be described. The multidimensional LUT 14 is a LUT which is composed of pairs of inputs and outputs at grid points formed by equal division as shown in FIG. 3. When the LUT 12 composed of only characteristic points is developed into the multidimensional LUT 14, loss of information of the characteristic points is sometimes caused as described with reference to FIG. 11. The new multidimensional LUT 25 according to the fifth embodiment is a multidimensional lookup table which is able to prevent loss of information of the characteristic points. Referring to FIG. 13, the new multidimensional LUT 25 will now be described.

Figure 14:
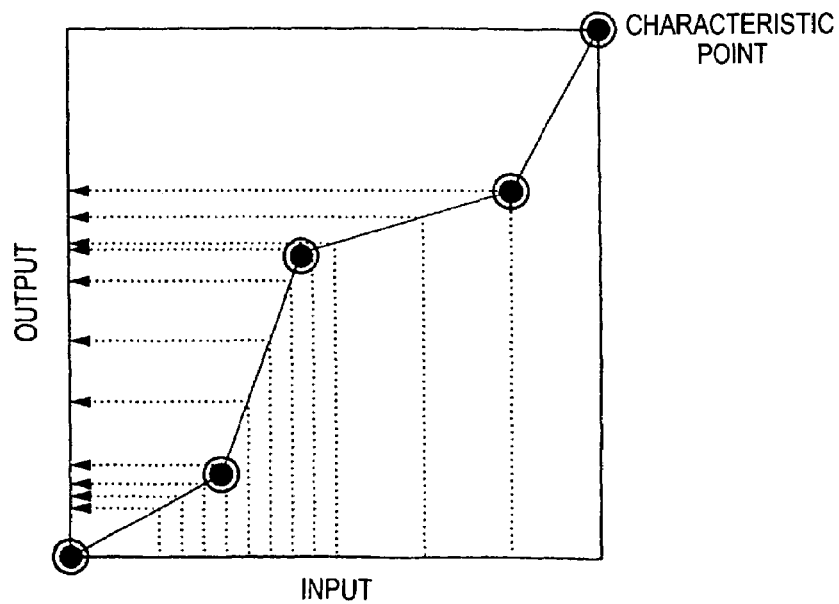
FIG. 14 is a diagram showing an image data converting process according to the fifth embodiment of the present invention.

The new multidimensional LUT 25 is characterized in that grid points obtained by combining a plurality of division points is used. As a result, the characteristic points can be included in the grid points without exception. An assumption is made that the characteristic point is an input point having number 5. When all of equal division points are made to be grid points as shown in FIG. 3, a method may be employed in which points obtained by division into eight sections are made to be the grid points. According to the fifth embodiment, grid points are composed by combining division into four sections and that into eight sections, as shown in FIG. 13. That is, the grid points are formed by fine division in a region adjacent to the characteristic points. On the other hand, great division is performed to form the grid points in a region in which no characteristic point exists. As a result, the multidimensional LUT 25 can be realized which is capable of preventing enlargement of the volume of the LUT and loss of information of the characteristic points. FIG. 14 shows change of the multidimensional LUT 14 shown in FIG. 11 and according to the first embodiment to the new multidimensional LUT 25 according to the fifth embodiment.

The table development means 24 develops the LUT 12 composed of only characteristic points into the new multidimensional LUT 25. The table development means 24 examines the relationships, such as the distances between the characteristic points and the grid points. Thus, the table development means 24 obtains grid points formed by combining a plurality of division points which contain the characteristic points without exception and with which the volume can be minimized so as to constitute the new multidimensional LUT 25. Since the multidimensional LUT 25 has the structure that the plurality of divisions are combined, information of the grid point distance (the distance in units of shortest distance among grid points of the input points) to the adjacent grid point and adjacent grid point information of an interpolation method with respect to an adjacent grid point are simultaneously described.

Figure 15A:
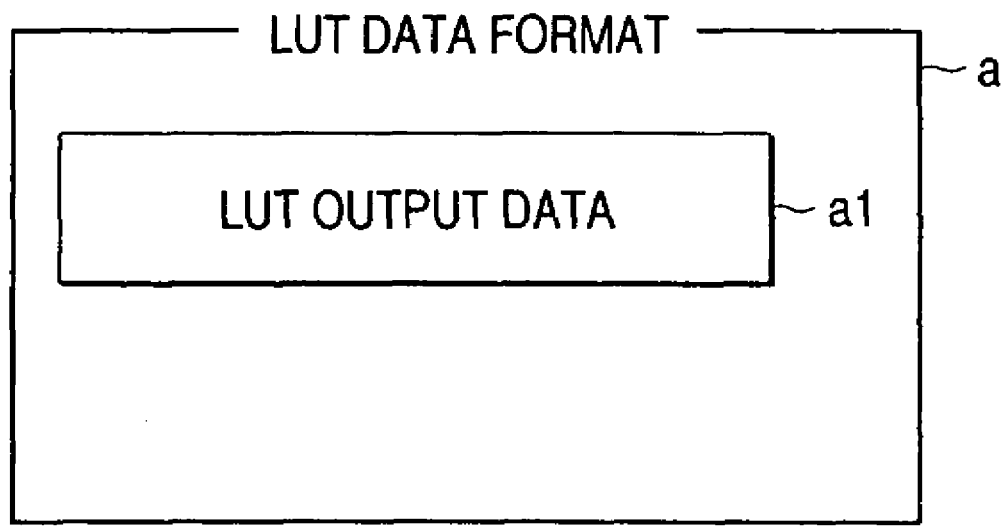
FIGS. 15A and 15B are diagrams showing the structure of a multidimensional LUT data format according to the fifth embodiment of the present invention.
Figure 15B:
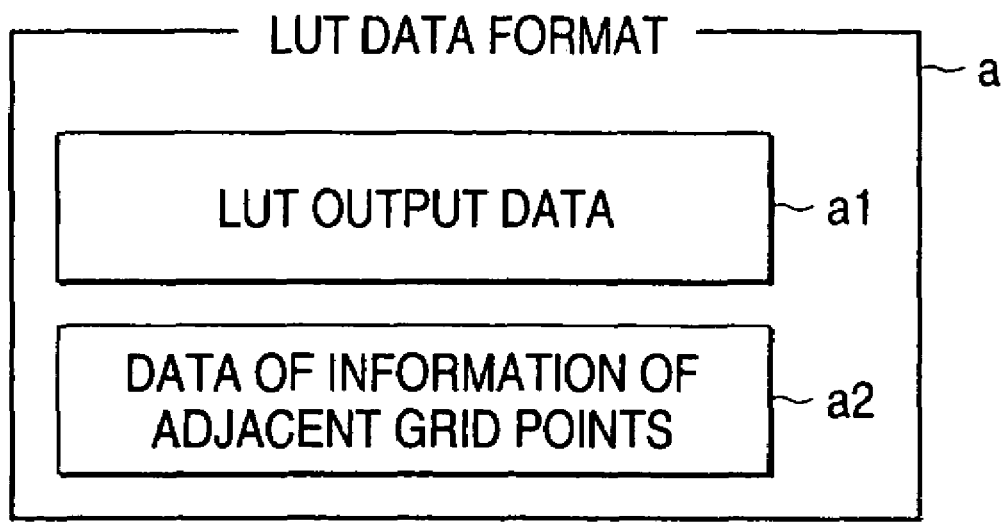

FIGS. 15A and 15B show a data format for one grid point of the multidimensional LUT 14 and the 25. FIG. 15A shows a data format of one grid point of the multidimensional LUT 14, and FIG. 15B shows a data format of one grid point of the new multidimensional LUT 25.

The image-data converting means 26 will now be described. Similarly to the image-data converting means 15 according to the first embodiment, the image-data converting means 26 converts input image data into output image data. The difference lies in that the new multidimensional LUT 25 is used to perform the conversion process. The new multidimensional LUT 25 includes LUT output data a1 and adjacent grid point information data a2. Initially, input image data is used to obtain LUT data corresponding to grid points which are used in the new multidimensional LUT 25. The LUT data format a has a structure as described with reference to FIGS. 15A and 15B. In accordance with LUT output data a1 of the obtained grid point and LUT output data a1 of the adjacent grid point, interpolation information of adjacent grid point information data a2 and information of the distance between grid point are used to convert input image data into output image data.

As described above, the fifth embodiment has the process for converting the LUT 12 which is composed of only characteristic points of the characteristic of the color device and the volume of which is small into the new multidimensional LUT 25. The table development means 24 performs the conversion into the new multidimensional LUT 25 with which loss of the characteristic points can be prevented and which has adjacent grid point information data a2. Therefore, the LUT 12 composed of only characteristic points having a small volume is able to describe the characteristic of the device. Moreover, loss of information indicated by the characteristic points of the characteristic of the device can be prevented when a process is performed.

Sixth Embodiment

Figure 16:
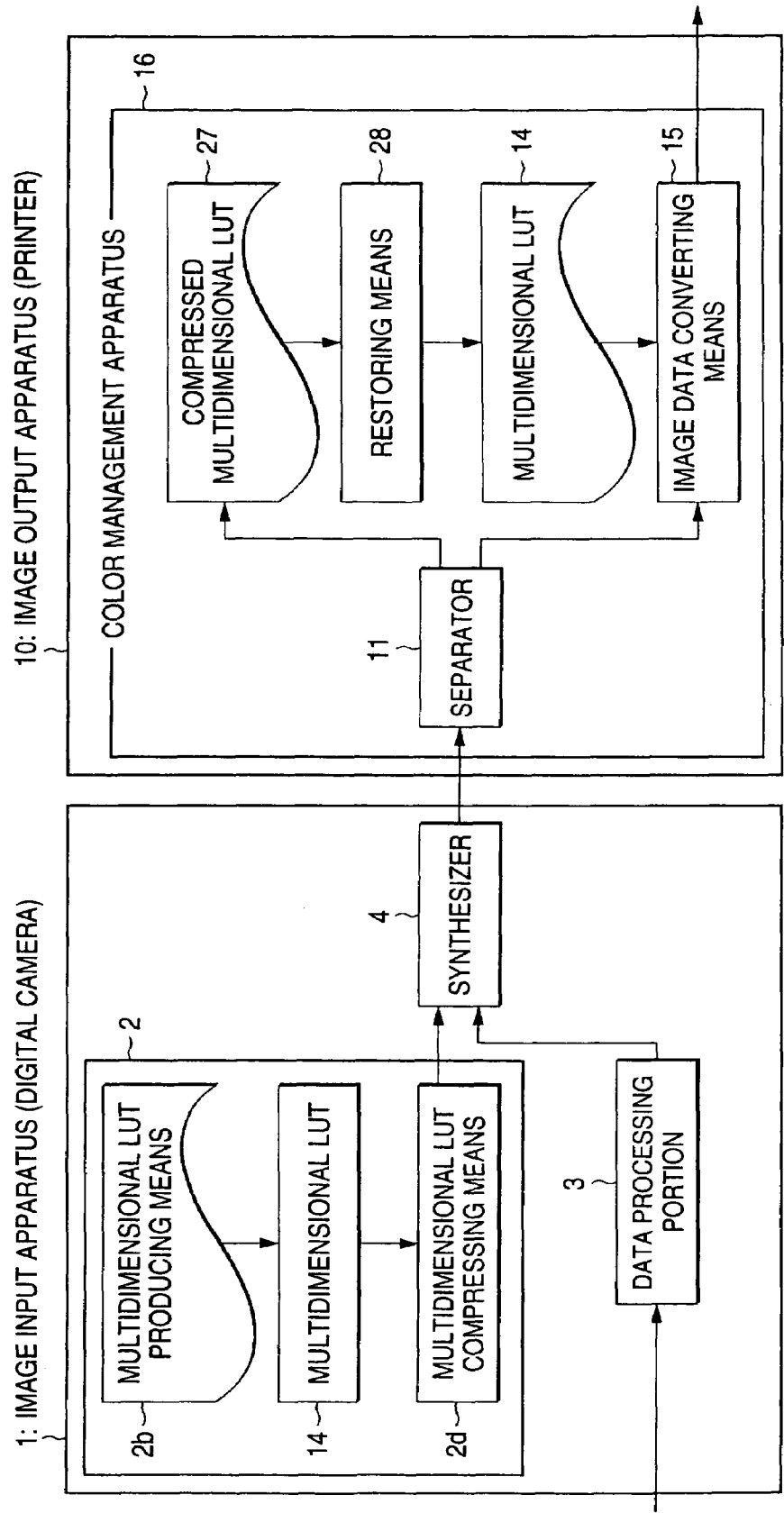
FIG. 16 is a block diagram showing the overall body according to a sixth embodiment of the present invention.

A sixth embodiment of the present invention will now be described. FIG. 16 is a block diagram showing the overall structure of the sixth embodiment of the present invention. Reference numeral 1 represents a digital camera which is an image input apparatus. Reference numeral 2 represents a color characteristic description apparatus composed of a multidimensional LUT producing means 2b for producing a multidimensional LUT 14 by a known method of least squares in accordance with the color characteristic of the digital camera which has been measured by a calorimeter. Moreover, the color characteristic description apparatus 2 is composed of a compressed multidimensional LUT means 2d for compressing the multidimensional LUT 14 produced by the multidimensional LUT producing means 2b so as to produce a multidimensional LUT 27. The color characteristic description apparatus 2 produces color characteristic data having the multidimensional LUT 27 and an identifier 29 for identifying a restoring and repairing method of the multidimensional LUT 27. The structure of color characteristic data is shown in FIG. 17.

Figure 17:
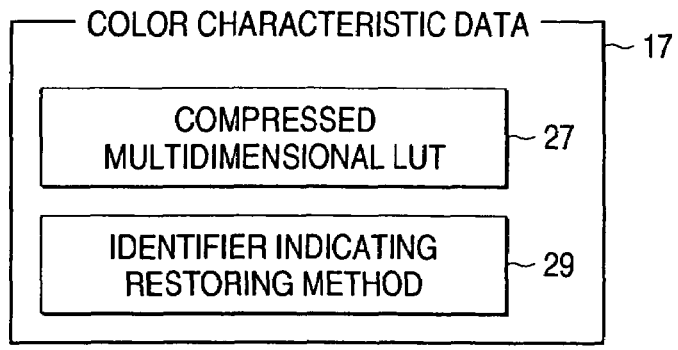
FIG. 17 is a diagram showing the structure of color characteristic data according to the sixth embodiment.

Referring to FIG. 17, reference numeral 17 represents color characteristic data according to this embodiment. Reference numeral 27 represents the compressed multidimensional lookup table which is an element of color characteristic data 17. Reference numeral 29 represents the identifier which is an element of color characteristic data 17 and which identifies a repairing and restoring method.

Reference numeral 3 represents a data processing portion for converting an image photographed by the digital camera into digital image data. Reference numeral 4 represents a synthesizer for synthesizing color characteristic data 17 having the multidimensional LUT 27 and the identifier 29 indicating the restoring and repairing method for the multidimensional LUT 27 and the image data 20 with each other so as to produce an image data format.

The multidimensional LUT means $2d$ compresses the multidimensional LUT 14 by a known compressing method, for example, a compressing method which is able to perform reversible conversion, such as an adaptive coding method or a compression library management method (LHA), or a FBTC method (refer to Japanese Patent Laid-Open No. 6-292027. By using the above-mentioned compressing method adaptable to image compression, the multidimensional LUT 14 is compressed. When the above-mentioned compressing method is employed, the volume of the multidimensional LUT 14 can be reduced. Thus, conversion into the multidimensional LUT 27 having all of information items which have been compressed can be performed.

Reference numeral 10 represents a color printer which is an image output apparatus for printing an image photographed by the digital camera 1. Reference numeral 11 represents a separator for separating the image data format transmitted from the digital camera 1 into image data 20 and color characteristic data 17. Reference numeral 27 represents a multidimensional LUT of color characteristic data 17 produced by the color characteristic description apparatus 2. Reference numeral 28 represents a restoring means for restoring the multidimensional LUT 27 into the multidimensional LUT 14 by using an identifier for identifying a restoring and repairing method for color characteristic data. Reference numeral 14 represents the restored multidimensional LUT. Reference numeral 15 represents an image-data converting means for converting input image data signal separated by the separator 11 into an output signal by using the multidimensional LUT 14. The separator 11, the restoring means 28, the multidimensional LUT 14 and the image-data converting means 15 constitute the color management apparatus 16.

A signal transmitted from the color management apparatus 16 is processed in the color printer 10 so as to be printed, similarly to the conventional structure.

Input image data of the image-data converting means 15 varies depending upon the type of the image input apparatus. Input image data is digital image signals, such as R, G and B signals of a scanner, R, G and B signals of a monitor, R, G and B signals of a CIE, X, Y and Z signals of the CIE or L, a and b signals of the CIE. On the other hand, output data of the image-data converting means 15 depends on the contents of the multidimensional lookup table LUT 13 (the type of the image input apparatus). Output data above is R, G and B signals of a scanner, R, G and B signals of a monitor, C, M and Y signals of a printer, R, G and B signals of a CIE, X, Y and Z signals of the CIE or L, a and b signals of the CIE.

The restoring means 28 is a restoring method adaptable to the compressing method employed when the compressed multidimensional LUT 27 has been produced with the identifier 29 indicating the restoring and repairing method of color characteristic data 17. Thus, the compressed multidimensional LUT 27 is restored to the multidimensional LUT 14.

Since the image-data converting means 15 is structured similarly to that according to the first embodiment, the image-data converting means 15 is omitted from description.

As described above, the sixth embodiment has the process for restoring the multidimensional LUT 27 formed by compressing the multidimensional LUT into the multidimensional LUT 14 by the restoring means 28. Therefore, the color characteristic of the device can be described by the compressed multidimensional LUT 27 having a small volume.

Seventh Embodiment

Figure 18:
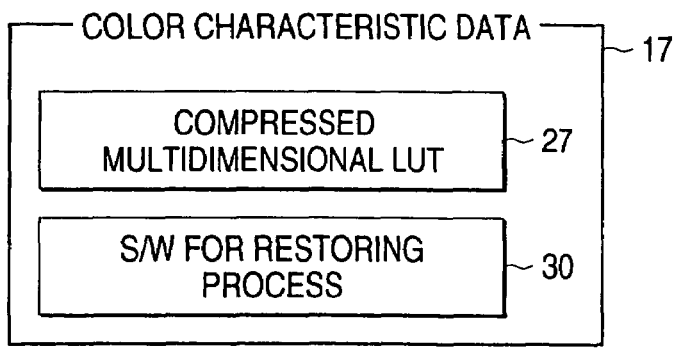
FIG. 18 is a diagram showing the structure of color characteristic data according to a seventh embodiment of the present invention.

A seventh embodiment of the present invention will now be described. FIG. 18 is a diagram showing the structure of color characteristic data according to the seventh embodiment of the present invention. Reference numeral 27 represents a compressed multidimensional LUT which is an element of color characteristic data 17. Reference numeral 30 represents software which is an element of color characteristic data 17 and which performs a restoring process.

The operation of the color management apparatus 16 which uses color characteristic data 17 according to the seventh embodiment will now be described such that the sixth embodiment is taken as an example. The compressed multidimensional LUT 27 in color characteristic data 17 is used as the compressed multidimensional LUT 27 in the color management apparatus 16 according to the sixth embodiment. Software 30 in the color characteristic data 17 for performing the restoring process is loaded as software for the restoring means 28 so as to be executed. Thus, table restoration is performed so that the multidimensional LUT 14 is restored. Then, the image-data converting means 15 uses the multidimensional LUT 14 so as to convert input image data into output image data.

As described above, the seventh embodiment has the structure that color characteristic data 17 is composed of the compressed multidimensional LUT 27 and the software 30 for performing the restoring process. Therefore, the color management apparatus 16 according to the sixth embodiment and arranged to use the compressed multidimensional LUT 27 is able to change the restoring process, which is performed by the restoring means 28, to be adaptable to color characteristic data 17. Thus, the color management apparatus 16 can be operated as described above.

Eighth Embodiment

Figure 19:
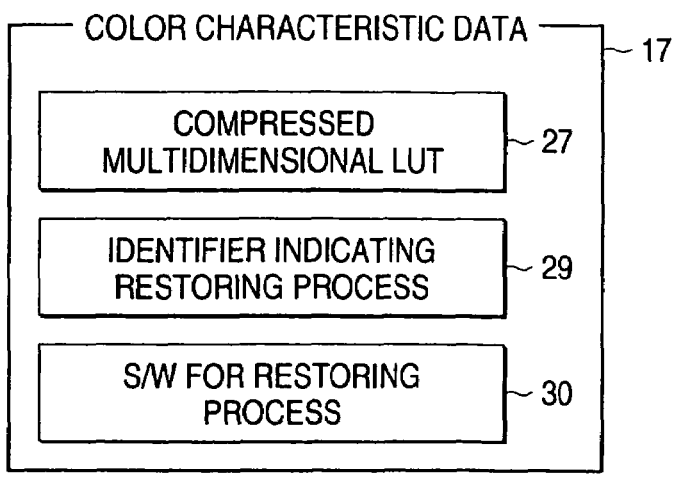
FIG. 19 is a diagram showing the structure of color characteristic data according to an eighth embodiment of the present invention.

An eighth embodiment of the present invention will now be described. FIG. 19 is a diagram showing the structure of color characteristic data according to the eighth embodiment of the present invention. Reference numeral 17 represents color characteristic data according to the present invention. Reference numeral 27 represents a compressed multidimensional LUT which is an element of color characteristic data 17. Reference numeral 29 represents an identifier which is an element of color characteristic data 17 and which indicates a restoring method. Reference numeral 30 represents software which is an element of color characteristic data 17 and which performs the restoring process.

The operation of a color management apparatus using color characteristic data 17 according to the eighth embodiment will now be described such that the sixth embodiment is taken as an example. The compressed multidimensional LUT 27 in color characteristic data 17 is used as the compressed multidimensional LUT 27 in the color management apparatus 16 according to the sixth embodiment. A CPU (not shown) or the like uses the identifier 29 indicating the restoring method which is loaded as software for the restoring and developing means 28 to perform the restoring and developing process. The restoring and developing means 28 performs the restoring and developing process so that the table is restored. Thus, restoration to the multidimensional LUT 14 is performed. The image-data converting means 15 uses the multidimensional LUT 14 to convert input image data into output image data.

As described above, the eighth embodiment has the structure that color characteristic data 17 is composed of the compressed multidimensional LUT 27, the identifier 29 indicating the restoring method and software 30 for performing the restoring and developing process. Therefore, the color management apparatus 16 using the compressed multidimensional LUT 27 according to the sixth embodiment can be arranged such that an appropriate restoring process is performed if an appropriate restoring method exists in the restoring and developing means 28. If any appropriate restoring method does not exist, the software 30 for performing the restoring and developing process is loaded. Thus, the restoring process is performed to cause the color management apparatus 16 to be operated.

Ninth Embodiment

Figure 20:
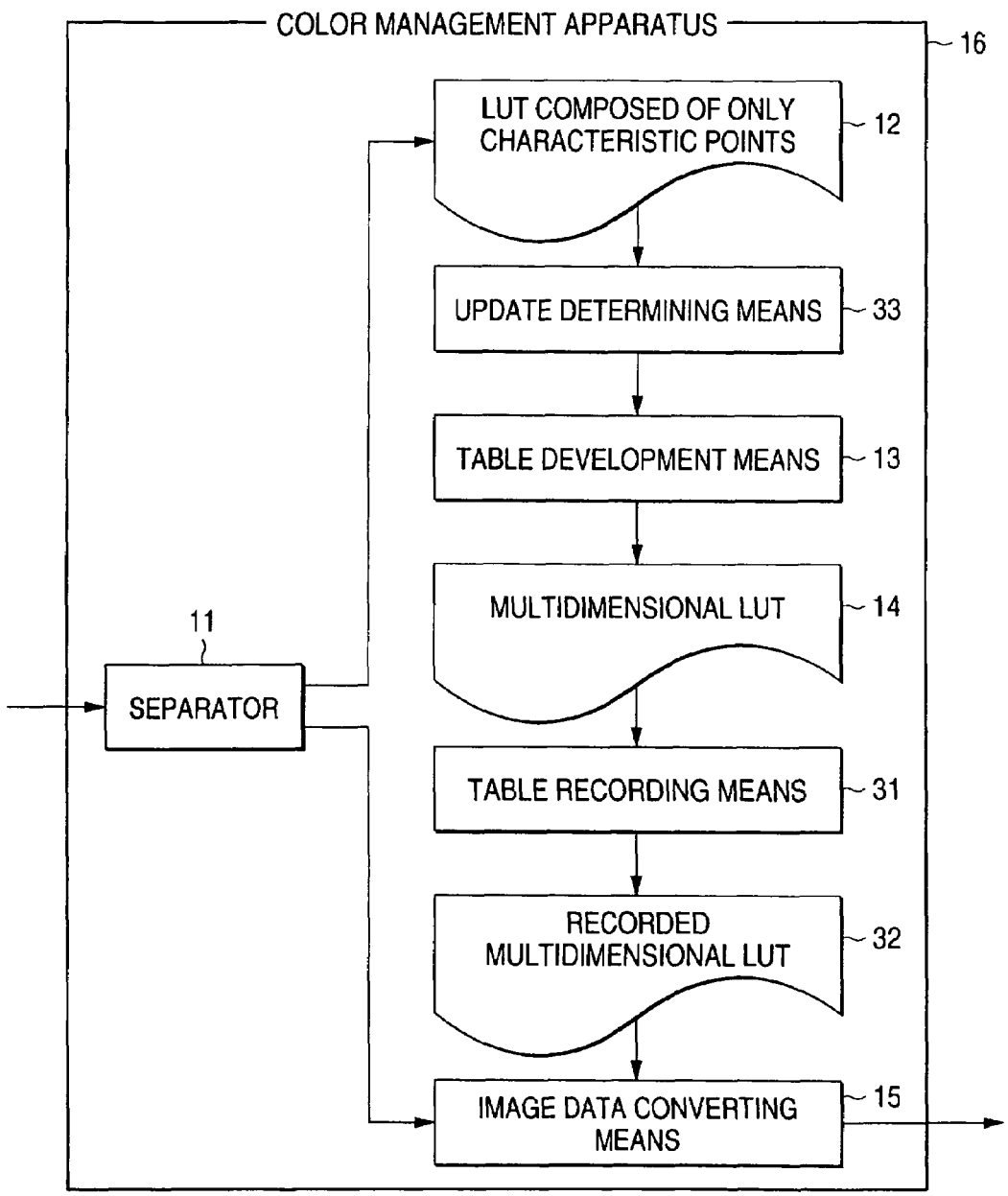
FIG. 20 is a block diagram showing a color management apparatus according to a ninth embodiment of the present invention.

A ninth embodiment of the present invention will now be described with reference to a drawing. FIG. 20 is a block diagram showing a color management apparatus according to the ninth embodiment of the present invention. Reference numeral 16 represents a color management apparatus according to the present invention. Reference numeral 12 represents a lookup table LUT composed of only characteristic points. Reference numeral 13 represents a table development means for developing the LUT composed of only characteristic points into a multidimensional lookup table. Reference numeral 14 represents a multidimensional LUT. Reference numeral 31 represents a table recording means for recording the multidimensional LUT 14 in a memory (not shown) or the like. Reference numeral 32 represents the recorded multidimensional LUT. Reference numeral 15 represents an image-data converting means for converting input image data into output image data by using the recorded multidimensional LUT 32. Reference numeral 33 represents an update determining means for determining whether or not update to the lookup table LUT composed of only characteristic points has been performed.

Input image data of the image-data converting means 15 varies depending upon the type of the image input apparatus. Input image data is digital image signals, such as R, G and B signals of a scanner, R, G and B signals of a monitor, R, G and B signals of a CIE, X, Y and Z signals of the CIE or L, a and b signals of the CIE. On the other hand, output data depends on the contents of the contents of the multidimensional LUT 14 (the type of the image input apparatus), that is, the type of the image input apparatus. Output data above is R, G and B signals of a scanner, R, G and B signals of a monitor, C, M and Y signals of a printer, R, G and B signals of a CIE, X, Y and z signals of the CIE or L, a and b signals of the CIE.

The LUT 12 composed of only characteristic points, the table development means 13 and the multidimensional LUT 14 are structured similarly to those according to the first embodiment. The table development means 13 is operated when the update determining means 33 has determined that the LUT 12 composed of only characteristic points has been updated, for example, the type of the image input apparatus is different and therefore the color characteristic is different.

The table recording means 31 is operated when the update determining means 33 has determined that the LUT 12 composed of only characteristic points has been updated. The table recording means 31 records the developed multidimensional LUT 14 as the recorded multidimensional LUT 32 recorded in a memory or the like.

The image-data converting means 15 is operated similarly to that according to the first embodiment. The difference lies in that the recorded multidimensional LUT 32 is employed as the LUT. The image-data converting means 15 is operated when input image data is supplied.

As described above, the ninth embodiment has the structure that the table development means 13 and the table recording means 31 are operated when the update determining means 33 determines that the LUT 12 composed of only characteristic points has been updated. Therefore, image data can be converted in only a processing period of time of the image-data converting means 15 when the conversion is performed. Therefore, the conversion process can quickly be completed.

Tenth Embodiment

A tenth embodiment of the present invention will now be described. The tenth embodiment of the present invention is characterized by a method of efficiently examining the characteristic points of a color device (an image input apparatus) when a LUT 12 composed of only characteristic points is produced. FIG. 21 is a graph showing the color characteristic of the color device for describing the tenth embodiment. The graph is expressed by using L*a*b color coordinate system regulated by International Illumination Association. The graph shows the color characteristic of a color device structured such that 0step indicates white. The gradient of the color is raised in proportion to the number of the step. Highest color saturation is realized at 8step. A variety of colors are reproduced which are measured by a colorimeter, resulting as shown in FIG. 21. In the drawing, color indicated with a dashed line given name is the characteristic point according to the first embodiment.

The foregoing colors are fundamental colors for the color device. The fundamental colors are colors realized by combining primary colors (RGB for a monitor and CMY (K) for a printer) for the color device. FIGS. 22A to 22C show the fundamental colors. The fundamental color are classified into primary colors, secondary colors, . . . , n-order colors (n is the number of primary colors) by combining the colors. The signals of the various colors have the same sizes. FIGS. 22A to 22C show the fundamental colors of the color device composed of three primary colors, that is, RGB. The heights of the signals indicate the size of the primary color signals. The primary colors are red, green and blue, secondary colors are yellow, magenta and cyan and the tertiary color is gray. When a variety of color devices are examined, the fundamental colors of the color device are included in the characteristic points. That is, when the fundamental colors of the color device are selected, the characteristic points can be examined.

As described above, the sixth embodiment has the structure that the fundamental colors composed by combining the primary colors of the color device having the same signal value are made to be the points indicating the relationships between inputs and outputs which are determined to be impossible to be developed in the table development process, that is, the characteristic points. Therefore, the characteristic points of the color device can efficiently be examined.

Eleventh Embodiment

Figure 23:
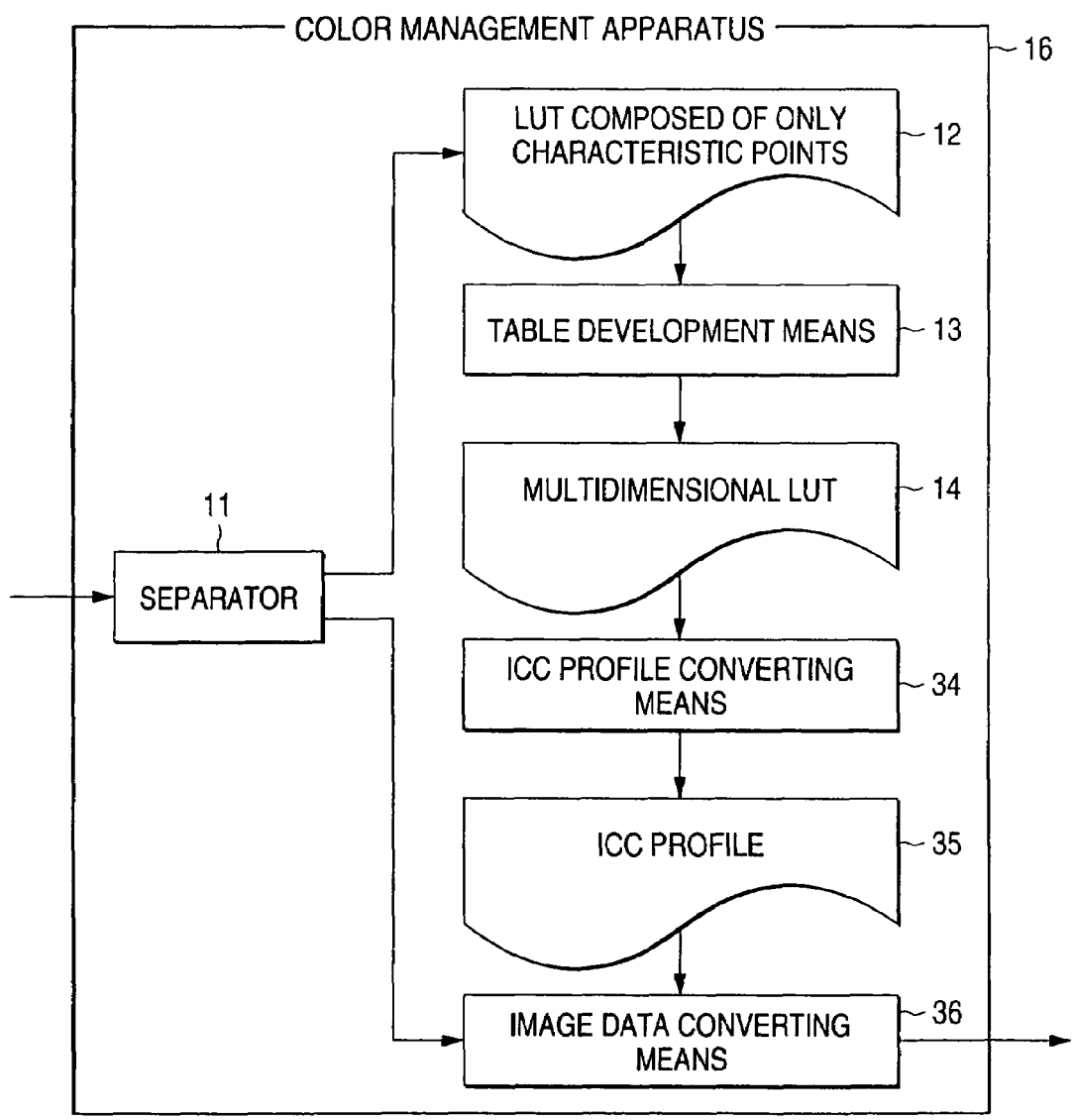
FIG. 23 is a block diagram showing a color management apparatus according to an eleventh embodiment of the present invention.

An eleventh embodiment of the present invention will now be described with reference to the drawings. Referring to FIG. 23, reference numeral 11 represents a separator for separating an image data format transmitted from the digital camera 1 into image data 20 and color characteristic data 17. Reference numeral 16 represents a color management apparatus according to the eleventh embodiment. Reference numeral 12 represents a LUT composed of only characteristic points. Reference numeral 13 represents a table development means for developing the LUT 12 composed of only characteristic points into a multidimensional LUT 14. Reference numeral 14 represents the multidimensional LUT developed by the table development means 13. Reference numeral 34 represents an ICC profile converting means. Reference numeral 35 represents an ICC profile. Reference numeral 36 represents an image-data converting means using the ICC profile 35.

Figure 24:
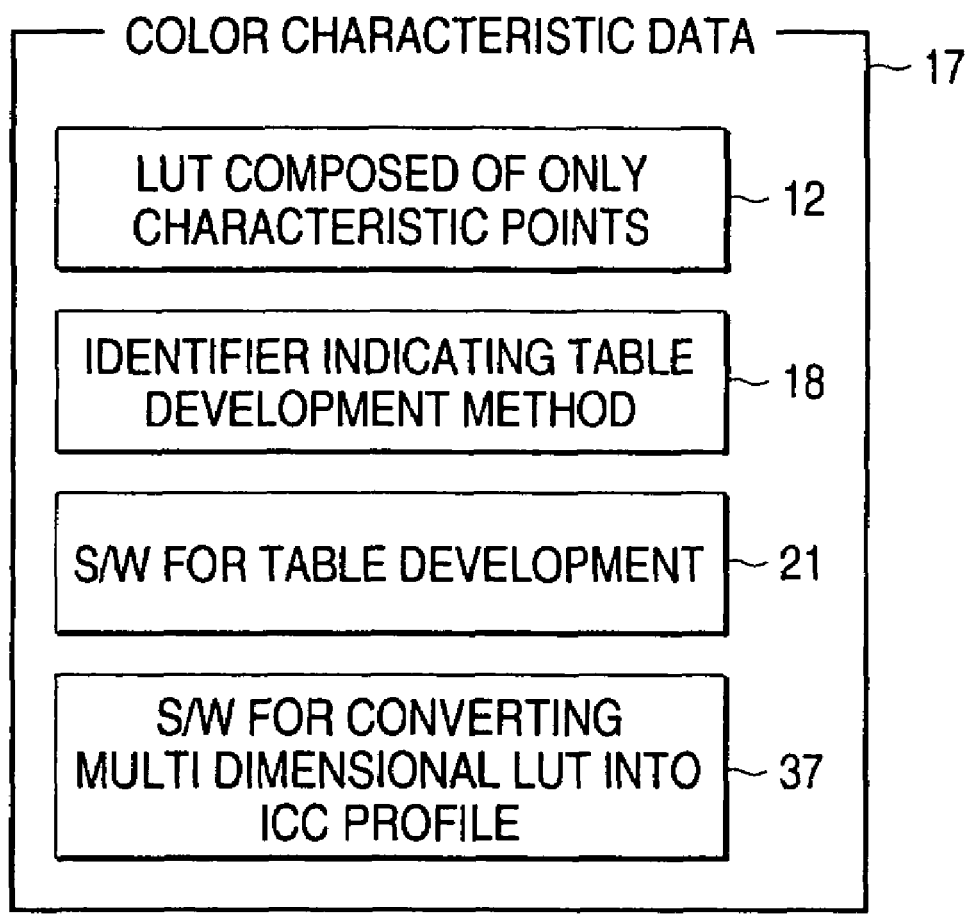
FIG. 24 is a diagram showing the structure of color characteristic data according to the eleventh embodiment of the present invention.

FIG. 24 is a diagram showing the structure of color characteristic data 17 for use-in the eleventh embodiment of the present invention, data being produced by the color characteristic description apparatus 2 according to the first embodiment. Reference numeral 17 represents color characteristic data according to the present invention. Reference numeral 12 represents a LUT which is an element of color characteristic data 17 and which is composed of only characteristic points. Reference numeral 18 represents an identifier which is an element of color characteristic data 17 and which indicates a table development method. Reference numeral 21 represents software which is an element of color characteristic data 17 and which performs the table development. Reference numeral 37 represents software for converting a multidimensional LUT subjected to the table development process into a known ICC profile.

The operation of the eleventh embodiment will now be described with reference to FIGS. 23 and 24. The LUT 12 included in color characteristic data 17 and composed of only characteristic points is used as the LUT 12 included in the color management apparatus 16 shown in FIG. 23 and composed of only characteristic points. The table development means 13 uses the identifier 18 indicating the table development method to cause a CPU (not shown) or the like to select a table development method. If a corresponding table development method does not exist, the software 21 included in color characteristic data 17 and arranged to perform the table development is loaded as software for the table development by the table development means 13. Then, the table development process is performed so that the table development is carried out. Thus, development to the multidimensional LUT 14 is performed. Then, software 37 for converting the multidimensional LUT 14 subjected to the table development process into a known ICC profile by the ICC profile converting means 34 is loaded and executed. Thus, conversion into the known ICC profile 35 is performed. Then, the image-data converting means 36 uses the ICC profile 35 to perform the image data conversion process so that input image data is converted into output image data.

As described above, the eleventh embodiment has the structure that color characteristic data 17 is composed of the LUT 12 composed of only characteristic points, the identifier 18 indicating the table development method, the software 21 for performing the table development process and the software 37. Therefore, the color management apparatus 16 using the LUT 12 according to the first embodiment and composed of only characteristic points is able to perform the table development process by an appropriate table development method if the appropriate method exists in the table development means 13. If no appropriate table development method exists, the software 21 for performing the table development process is loaded so that the table development process is performed. Thus, the ICC profile can be converted. Thus, the image conversion color management apparatus can be operated with the ICC profile.

Twelfth Embodiment

Figure 25:
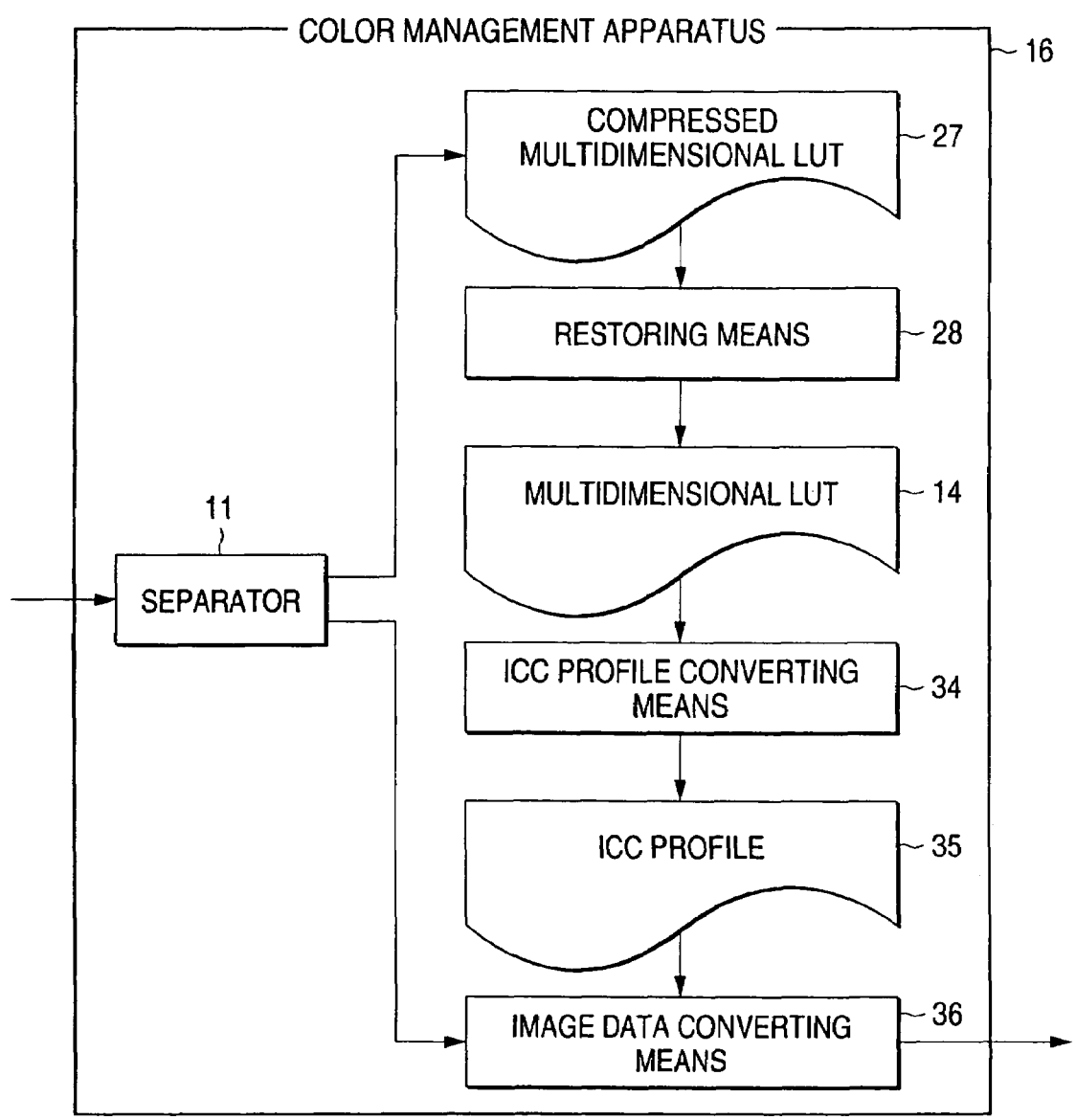
FIG. 25 is a block diagram showing a color management apparatus according to a twelfth embodiment of the present invention.

A twelfth embodiment of the present invention will now be described. Referring to FIG. 25, reference numeral 11 represents a separator for separating an image data format transmitted from the digital camera 1 into image data 20 and color characteristic data 17. Reference numeral 27 represents a compressed multidimensional LUT of color characteristic data 17 produced by the color characteristic description apparatus 2. Reference numeral 28 represents a restoring means for restoring the compressed multidimensional LUT 27 into the multidimensional LUT 14 by using the identifier 29 indicating the restoring and repairing method for color characteristic data. Reference numeral 14 represents a multidimensional LUT restored by the restoring means 28. Reference numeral 34 represents an ICC profile converting means for converting the multidimensional LUT 14 into an ICC profile. Reference numeral 35 represents the ICC profile converted by the ICC profile converting means. Reference numeral 36 represents an image-data converting means for converting an input image data signal separated by the separator 11 into an output signal.

Figure 26:
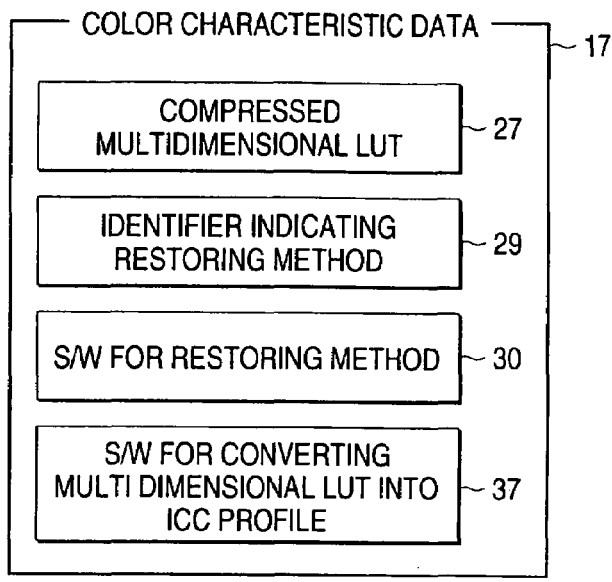
FIG. 26 is a diagram showing the structure of color characteristic data according to the twelfth embodiment of the present invention.

FIG. 26 is a diagram showing the structure of color characteristic data 17 for use in the twelfth embodiment of the present invention, color characteristic data 17 being produced by, for example, the color characteristic description apparatus 2 according to the sixth embodiment. Reference numeral 17 represents color characteristic data according to the present invention. Reference numeral 27 represents a compressed multidimensional LUT which is an element of color characteristic data 17. Reference numeral 29 represents an identifier which is an element of color characteristic data 17 and which indicates a restoring method. Reference numeral 30 represents software which is an element of color characteristic data 17 and which performs the restoring process. Reference numeral 37 represents software for converting the multidimensional lookup table subjected to the table development process into a known ICC profile.

The operation of the twelfth embodiment will now be described with reference to FIG. 25. The compressed multidimensional LUT 27 in color characteristic data 17 is used as the multidimensional LUT 27 in the color management apparatus 16 shown in FIG. 25. The restoring means 28 uses the identifier 29 indicating the restoring method to cause a CPU (not shown) or the like to select a restoring method. If a corresponding restoring method does not exist, the software 30 contained in color characteristic data 17 and arranged to perform the restoring process is loaded as the software for the restoring process. Then, the restoring means 28 performs the restoring process so that the table is restored. Thus, restoration to the multidimensional LUT 14 is performed. Then, the software 37 for causing the ICC profile converting means 34 to convert the multidimensional LUT 14 subjected to the restoring process into the known ICC profile is loaded and executed. Thus, conversion into the known ICC profile 35 is performed. Then, the image-data converting means 36 uses the ICC profile 35 to perform an image data conversion process. As a result, input image data is converted into output image data.

As described above, the twelfth embodiment has the structure that color characteristic data 17 is composed of the compressed multidimensional LUT 27, the identifier 29 indicating the restoring method, the software 30 for performing the restoring process and the software 37. Therefore, the color management apparatus 16 according to the sixth embodiment and arranged to use the compressed multidimensional LUT 27 is able to perform an appropriate process if an appropriate restoring method exists. If no appropriate method exists, the software 30 for performing the restoring process is loaded so that the restoring process is performed. Then, the software 37 for performing conversion into the ICC profile is able to perform the conversion into the ICC profile. Thus, even a color management apparatus for converting an image with the ICC profile can be operated.

Thirteenth Embodiment

Figure 27:
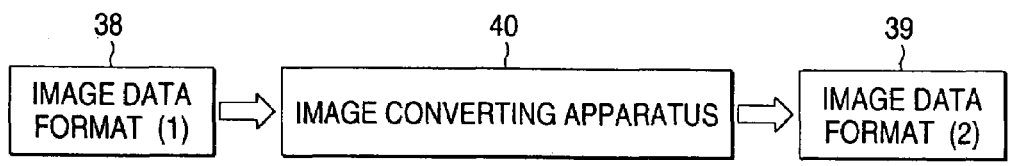
FIG. 27 is a flow chart of data in an image converting apparatus according to a thirteenth embodiment of the present invention.

A thirteenth embodiment of the present invention will now be described with reference to the drawings. The thirteenth embodiment has a structure constituted by separating the color management apparatus 16 from the image output apparatus 10 so that an independent image converging apparatus is formed. FIG. 27 is a flow chart of data in the image converging apparatus according to the thirteenth embodiment of the present invention. Reference numeral 38 represents image data format (1) of color characteristic data 17 and image data 20 which are input to the image converging apparatus. Reference numeral 39 represents an image data format (2) of color characteristic data 17a and image data 20a after the image converting apparatus has converted image data 20. Reference numeral 40 represents the image converting apparatus according to the thirteenth embodiment.

The shape of the image data format (1) 38 and that of the image data format (2) 39 are similar to those shown in FIG. 7.

The operation will now be described. Image data 20 input to the image converting apparatus 40 in the form of the image data format 38 is subjected to a process, which is performed by the color management apparatus 16, by the image converting apparatus 40 by using color characteristic data 17 corresponding to image data 31. Then, converted image data 20a and color characteristic data 17a adaptable to converted image data 20a are added to each other so that data above is transmitted in the form of the image data format 39.

As described above, the thirteenth embodiment has the structure that the image converting apparatus 40 uses color characteristic data 17 corresponding to image data 20 to perform the process of image data 20, which is performed by each color management apparatus 16 and which is input to the image converting apparatus 40 in the form of the image data format 38. Then, converted image data 20a and color characteristic data 17a adaptable to converted image data 20a are added to each other so as to be transmitted in the form of the image data format 39. Therefore, converted image data 20a and color characteristic data 17a adaptable to image data 20a always exist in the form of a pair. Thus, the following color process can efficiently be performed.

The color management apparatus 16 is separated from the image output apparatus 10 so as to be the image converting apparatus 40. Therefore, even an image output apparatus 10 which does not incorporate the color management apparatus 16 is able to process image data processed by the color characteristic description apparatus to transmit data as an image when an output of the image converting apparatus 40 is input.

When the image converting apparatus 40 is connected to a plurality of image output apparatuses 10, the image converting apparatus 40 can be shared.

Fourteenth Embodiment

Figure 28:
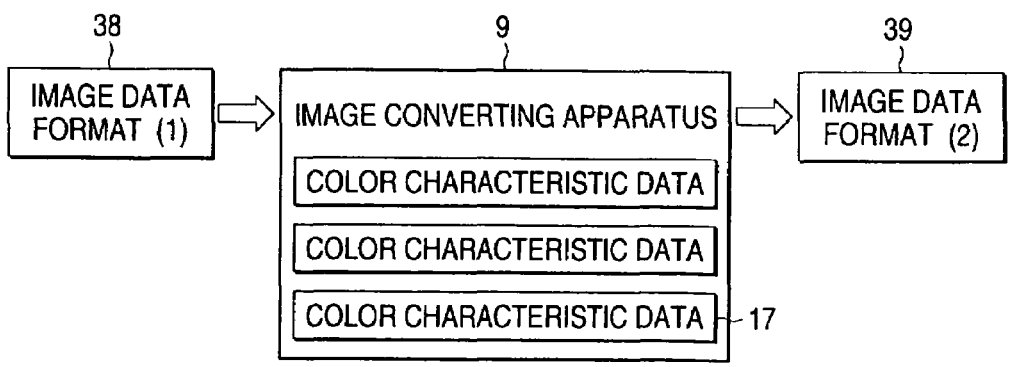
FIG. 28 is a flow chart of data in an image converting apparatus according to a fourteenth embodiment of the present invention.
Figure 30:
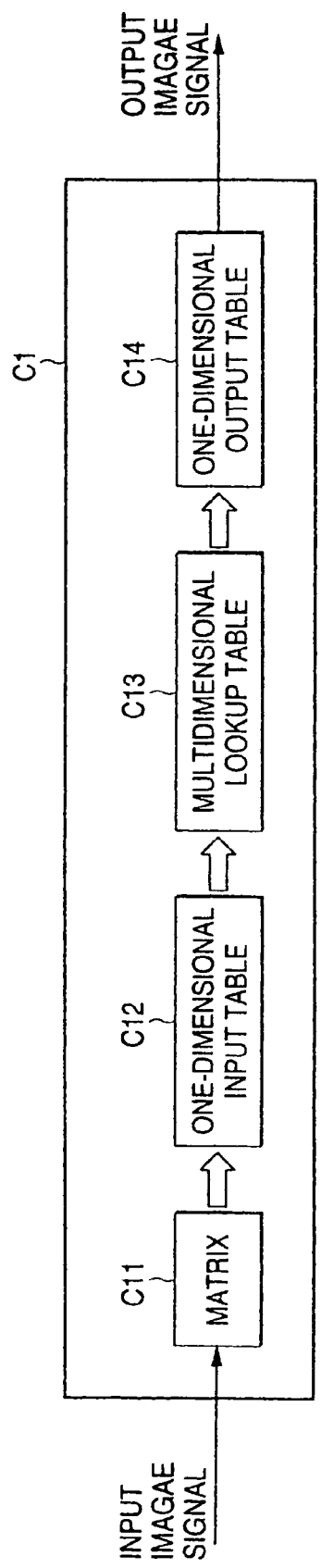
FIG. 30 is a diagram showing a process for converting image data in the conventional apparatus.

A fourteenth embodiment of the present invention will now be described with reference to the drawings. FIG. 28 is a flow chart of data in an image converting apparatus according to the fourteenth embodiment of the present invention. Reference numerals 38 and 39 represent the image data format (1) and the image data format (2) according to the thirteenth embodiment. Reference numeral 40 represents an image converting apparatus according to the fourteenth embodiment. The image converting apparatus 40 includes a plurality of color characteristic data items 17 in the forms shown in FIGS. 16, FIGS. 17 to 19 and FIGS. 21 to 24 and having different color characteristics.

The operation will now be described. Image data 20 input to the image converting apparatus 40 in the form of the image data format 32 is processed by the image converting apparatus 40. The process, which is performed by each of the color management apparatus 16, is performed by using color characteristic data 17 corresponding to image data 20 and color characteristic data 17 in the image converting apparatus 40 selected by a CPU (not shown) or the like. Also color characteristic data 17 in the image converting apparatus 40 includes color characteristic data included in the image data format (1). When the CPU selects color characteristic data suitable to a purpose, a process except for the process regulated by the image data format (1) can be performed. Converted image data 20a and color characteristic data 17 suitable to converted image data 20a are added to each other so that data is transmitted in the form of the image data format 39.

As described above, the fourteenth embodiment has the structure that the image converting apparatus 40 performs the process which is performed by each color management apparatus 16. The image converting apparatus 40 processes image data 20 input to the image converting apparatus 40 in the form of the image data format 38 by using color characteristic data 17 corresponding to image data 20 and color characteristic data 17b in the image converting apparatus 40 selected by a CPU (not shown) or the like. Thus, a portion except for converted image data 20a and color characteristic data 17a suitable to converted image data 20a is included. Since data is output in the form of the image data format 39, conversion into image data having various color characteristics by the number of color characteristic data 17b included in the image converting apparatus 40 can be performed.

When color characteristic data is formed into data including information about a light source, a single image reproducing apparatus connected as a next apparatus is able to reproduce images by dint of different light sources.

Although the foregoing embodiments are structured to convert color image data, the present invention may be applied to image data having a single halftone color.

As described above, according to the first aspect of the present invention, color characteristic data is composed of a LUT composed of only characteristic points. Therefore, the color management apparatus using the LUT composed of only characteristic points to convert input image data into output image data is able to obtain precise color characteristic data without enlargement of the volume of color characteristic data. Thus, the operation of the color management apparatus can appropriately be performed.

The second aspect of the present invention has the structure that the fundamental colors constituted by combining primary colors of a color device having the same signal value are made to be the points indicating the relationships between inputs and outputs which are determined to be impossible to be developed in the table development process, that is, the characteristic points. Therefore, an effect can be obtained in that the characteristic points of a color device can efficiently be examined.

The third aspect of the present invention has the structure that color characteristic data is composed of the LUT composed of only characteristic points and the identifier indicating the table development method. Therefore, the operation of a color management apparatus using the LUT composed of only characteristic points and arranged to convert input image data into output image data can appropriately be performed.

A fourth aspect of the present invention has the structure that color characteristic data is composed of the LUT 21 composed of only characteristic points and the software for performing the table development process. Thus, an effect can be obtained in that the table development process of the color management apparatus using the LUT composed of only characteristic points and arranged to convert input image data into output image data can be changed to correspond to color characteristic data.

The fifth aspect of the present invention has the structure that color characteristic data is composed of the LUT composed of only characteristic points, the identifier indicating the table development method, the software for performing the table development process and the ICC profile converting software. Therefore, the color management apparatus using the LUT composed of only characteristic points and arranged to convert input image data into output image data is able to perform an appropriate table development process if the appropriate table development method exists. If no appropriate table development method exists, the software for performing the table development process is loaded to perform the table development process. Then, conversion into the ICC profile can be performed. Therefore, an effect can be obtained in that even a color management apparatus for converting an image with the ICC profile can be operated.

The sixth aspect of the present invention has the structure that color characteristic data is composed of the compressed multidimensional LUT and the identifier indicating a restoring method. Therefore, an effect can be obtained in that the operation of the color management apparatus using the compressed multidimensional LUT and arranged to convert input image data into output image data can appropriately be performed.

The seventh aspect of the present invention has the structure that color characteristic data is composed of the compressed multidimensional LUT and the software for performing the restoring process. Therefore, an effect can be obtained in that the color management apparatus using the compressed multidimensional LUT and arranged to convert input image data into output image data can be operated such that the restoring process is changed to correspond to color characteristic data.

The eighth aspect of the present invention has the structure that color characteristic data is composed of the compressed multidimensional LUT, the identifier indicating a restoring method, the software for performing the restoring process and the ICC profile converting software. Therefore, an effect can be obtained in that the color management apparatus using the compressed multidimensional LUT and arranged to convert input image data into output image data is able to perform an appropriate restoring process if the appropriate restoring method exists. If appropriate restoring method does not exist, the software for performing the restoring process is loaded to perform the restoring process. Then, conversion into the incorporate can be performed. Thus, the color management apparatus for converting an image with the ICC profile can be operated.

The ninth and sixteenth aspects of the present invention incorporate the image data converting apparatus which uses the LUT, the volume of which is smaller than the multidimensional LUT and which is composed of only characteristic points of the color characteristic of a color device so as to directly convert an image signal. Therefore, an effect can be obtained in that the characteristic of the device can be described with the LUT having a small volume and which is composed of only characteristic points. Moreover, loss of information indicated by the characteristic point of the characteristic of the color device can be prevented. Thus, all of information can be processed.

The tenth aspect of the present invention incorporates the process for converting the LUT having a small volume as compared with a multidimensional LUT and composed of only characteristic points of the characteristic of a color device into the multidimensional LUT by the table development process. Therefore, an effect can be obtained in that the color management apparatus can be operated by only the LUT having a small volume and composed of only characteristic points of the characteristic of the device.

The eleventh aspect of the present invention has the process for converting the LUT having a small value and composed of only characteristic points of the characteristic of a color device into a new multidimensional LUT having data of information about adjacent grid points for preventing loss of characteristic points. Therefore, an effect can be obtained in that the characteristic of the device can be described by only the LUT having a small volume and composed of only characteristic points. Moreover, all of information items indicated by the characteristic points of the characteristic of the color device can be processed.

The twelfth aspect of the present invention has the structure that information of the distances between grid points and the interpolation method about the adjacent grid points in the multidimensional lookup table is described together with LUT output data. Therefore, different interpolation methods can be employed for each small region composed of the adjacent grid points. Thus, an effect can be obtained in that an accurate interpolation process can be performed.

The thirteenth aspect of the present invention has the restoring process for restoring a compressed multidimensional LUT formed by compressing a multidimensional LUT to the multidimensional LUT. Therefore, an effect can be obtained in that the color characteristic of the device can be described with the compressed multidimensional LUT having a small volume.

The fourteenth aspect of the present invention has the structure that the table development process and the table recording process are performed when the lookup table LUT composed of only characteristic points has been updated. Therefore, when image data is converted, the conversion of image data can be completed in only the processing period of time of the process for converting image data. Therefore, an effect can be obtained in that the conversion process can quickly be completed.

The fifteenth aspect of the present invention has the structure that the image converting apparatus performs the process of the color management apparatus. That is, the image converting apparatus subjects image data which is input to the image converting apparatus in the form of the image data format to the process by using color characteristic data corresponding to image data and color characteristic data in the image converting apparatus selected by the CPU (not shown) or the like. Then, converted image data and color characteristic data adaptable to converted image data are added to each other so as to be transmitted in the form of the image data format. Therefore, selection of the CPU (not shown) enables conversion into image data having a variety of color characteristics to be performed. Moreover, an effect can be obtained in that also the color characteristic of converted image data can be described and thus the following color process can efficiently be performed.

What is claimed is:

1. A color characteristic description apparatus for producing color characteristic data for use when supplied image data is converted into output image data and for producing an identifier, the color characteristic description apparatus comprising:

multidimensional lookup table producing means for producing a multidimensional lookup table by using said identifier to select a table development method suitable for color characteristics associated with a device producing the image data, the multidimensional lookup table being produced from a separate lookup table having only color characteristic points representing the supplied image data, the color characteristic points representing a relationship between a first point and a final point and any points in between the supplied image data and output image data; and multidimensional lookup table compression means for compressing said multidimensional lookup table, wherein the color characteristic data, which is produced by the color characteristic description apparatus, includes the compressed multidimensional lookup table and the identifier, the identifier being an element of the color characteristic data which identifies a restoring method for restoring the compressed multidimensional lookup table.

2. The color characteristic description apparatus according to claim 1, wherein the color characteristic points, which represent the supplied image data, includes color intensity data of Red, Green, and Blue.

3. A color characteristic description apparatus for producing color characteristic data for use when supplied image data is converted into output image data, comprising:

multidimensional lookup table producing means for producing a multidimensional lookup table by using an identifier to select a table development method suitable for color characteristics associated with a device producing the image data, the multidimensional lookup table being produced from a separate lookup table having only color characteristic points representing the supplied image data, the color characteristic points representing a relationship between a first point and a final point and any points in between the supplied image data and output image data; and multidimensional lookup table compression means for compressing said multidimensional lookup table, wherein the color characteristic data, which is produced by the color characteristic description apparatus, includes the compressed multidimensional lookup table and software for restoring the compressed multidimensional lookup table.

4. The color characteristic description apparatus according to claim 3, wherein the color characteristic points, which represent the supplied image data, includes color intensity data of Red, Green, and Blue.

5. A color characteristic description apparatus according to claim 3, wherein color characteristic data which is produced by said color characteristic description apparatus further incorporates said identifier for identifying a restoring method for restoring compressed data and software for converting the restored multidimensional lookup table into an ICC profile.

6. A color characteristic description apparatus comprising:
a multidimensional lookup table producer for producing a multidimensional lookup table from a separate lookup table having only color characteristic points representing a supplied image data; and
a compressor for compressing said multidimensional lookup table,
wherein said color characteristic description apparatus outputs color characteristic data, which includes said compressed multidimensional lookup table and an identifier which is an element of the characteristic data, for identifying a restoring method for restoring said compressed multidimensional lookup table and a repairing method.

7. The color characteristic description apparatus according to claim 6, wherein said outputted color characteristic data is synthesized with image data.

8. The color characteristic description apparatus according to claim 6, wherein said identifier further identifies a repairing method for repairing said compressed multidimensional lookup table.

9. The color characteristic description apparatus according to claim 6, wherein said multidimensional lookup table is produced in accordance with color characteristics of a digital camera.

10. The color characteristic description apparatus according to claim 9, wherein color characteristics of said digital camera are measured by a colorimeter.

11. A method of outputting color characteristic data from a digital camera, said method comprising the steps of:
producing a multidimensional lookup table in a color characteristic description apparatus by using an identifier to select a table development method suitable for color characteristics associated with said digital camera, the multidimensional lookup table being produced from a separate lookup table having only color characteristic points representing a supplied image data from the digital camera;
compressing said multidimensional lookup table in said color characteristic description apparatus;
outputting said color characteristic data from said color characteristic description apparatus, said color characteristic data including said compressed multidimensional lookup table and said identifier which is an element of the characteristic data, for identifying a restoring method for restoring said compressed multidimensional lookup table; and
synthesizing said outputted color characteristic data with image data, which is then outputted as camera output data and a repairing method.

12. The color characteristic description apparatus according to claim 6, wherein the compressed multidimensional lookup table includes color intensity data of Red, Green, and Blue.

13. The color characteristic description apparatus according to claim 11, wherein the compressed multidimensional lookup table includes color intensity data of Red, Green, and Blue.

* * * * *